US012726774B2

(12) United States Patent
Lee et al.

(10) Patent No.: US 12,726,774 B2
(45) Date of Patent: Sep. 1, 2026

(54) APPARATUS AND DRIVING METHOD THEREOF

(71) Applicant: LG Display Co., Ltd., Seoul (KR)

(72) Inventors: Wansoo Lee, Paju-si (KR); YoungWook Ha, Paju-si (KR); Chiwan Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 262 days.

(21) Appl. No.: 18/493,181

(22) Filed: Oct. 24, 2023

(65) Prior Publication Data

US 2024/0179476 A1 May 30, 2024

(30) Foreign Application Priority Data

Nov. 25, 2022 (KR) ........................ 10-2022-0159947

(51) Int. Cl.

*H04R 17/10* (2006.01)
*G08B 6/00* (2006.01)
*H04R 1/02* (2006.01)
*H04R 3/00* (2006.01)

(52) U.S. Cl.

CPC ............... *H04R 17/10* (2013.01); *G08B 6/00* (2013.01); *H04R 1/028* (2013.01); *H04R 3/00* (2013.01); *H04R 2400/03* (2013.01); *H04R 2499/15* (2013.01)

(58) Field of Classification Search

CPC .......... H04R 17/10; H04R 1/028; H04R 3/00; H04R 2400/03; H04R 2499/15; G08B 6/00

See application file for complete search history.

(56) References Cited

U.S. PATENT DOCUMENTS

2020/0401187 A1* 12/2020 Noh ....................... G06F 1/1652
2022/0208163 A1* 6/2022 Sung ................... B60R 11/0235

FOREIGN PATENT DOCUMENTS

JP 2003211087 A * 7/2003
JP 2021-164165 A 10/2021

OTHER PUBLICATIONS

Machine translation of JP2003211087A (Year: 2003).*

* cited by examiner

*Primary Examiner* — Andrew Sniezek

(74) *Attorney, Agent, or Firm* — Birch, Stewart, Kolasch & Birch, LLP

(57) ABSTRACT

An apparatus can include a display member configured to display an image and a vibration apparatus disposed at a rear surface of the display member. Also, the vibration apparatus is configured to vibrate the display member using a driving signal based on a driving mode, and vibrate the display member using a vibration signal based on a vibration mode.

19 Claims, 12 Drawing Sheets

APPARATUS AND DRIVING METHOD THEREOF

CROSS-REFERENCE TO RELATED APPLICATIONS

This application claims priority to Korean Patent Application No. 10-2022-0159947 filed on Nov. 25, 2022 in the Republic of Korea, the entirety of which is incorporated herein by reference into the present application as if fully set forth herein.

BACKGROUND

Technical Field

The present disclosure relates to an apparatus for outputting a sound and a driving method of the apparatus.

Description of the Related Art

Apparatuses include a display member for displaying an image and a sound apparatus for outputting a sound associated with the image displayed by the display member. In apparatuses, a screen is progressively enlarged, but the demand for lightness and thinness is increasing. However, because apparatuses should include a sufficient space where a sound apparatus is embedded, such as a speaker for outputting a sound, it is difficult to implement lightness and thinness. Also, a sound generated by a sound apparatus embedded in an apparatus is output in a direction toward a rear surface (e.g., behind the apparatus) or a lateral surface of a main body of the apparatus instead of toward a front surface of a display member, and due to this, the sound does not travel toward a viewer or a user, watching an image, of a forward region with respect to the front surface of the display member. This can cause a limitation where the immersion experience of a viewer watching an image is hindered or impaired.

Moreover, a speaker applied to apparatuses can be, for example, an actuator including a coil and a magnet. However, in a situation where the actuator is applied to apparatuses, there is a drawback where a thickness is thick and the apparatus is made larger. Piezoelectric devices enabling implementation of a thin thickness are attracting much attention. Because piezoelectric devices have a fragile characteristic, the piezoelectric devices are easily damaged by an external impact, and due to this, there is a limitation where the reliability of sound reproduction is low. Also, thin display apparatuses or flexible display apparatuses can experience a limitation in which a dent or a depression occurs in one or more layers due to a user pressing on the screen or an external impact, which can impair image quality. Thus, there exists a need to be able to recover or restore a dent in a display member and providing a thin or flexible apparatus that has improved directional sound quality.

SUMMARY OF THE DISCLOSURE

The inventors have recognized limitations described above and have performed various research and experiments for outputting a sound in a forward direction of a screen. Based on the various research and experiments, the inventors have invented a new apparatus which can output a sound in a forward direction of a screen toward the viewer. Also, the inventors have recognized a limitation where a dent caused by a press of a display apparatus (or a screen) by a finger or a touch pen is not recovered and is recognized with eyes due to lightness and slimness in a display apparatus (or a flexible display apparatus) including a ductile and thin material, and thus, have performed various research and experiments for recovering a dent caused by a press of a display apparatus (or a screen). Based on the various research and experiments, the inventors have invented a new apparatus which can recover a dent caused by a press of a display member.

One or more aspects of the present disclosure are directed to providing an apparatus and a driving method thereof, which can vibrate a display member to output a sound in a forward direction of the display member.

One or more aspects of the present disclosure are directed to providing an apparatus and a driving method thereof, which can recover a dent caused by a press of a display member.

Additional features and aspects will be set forth in the description that follows, and in part will be apparent from the description, or can be learned by practice of the inventive concepts provided herein. Other features and aspects of the inventive concepts can be realized and attained by the structure particularly pointed out in the written description, or derivable therefrom, and the claims hereof as well as the appended drawings.

To achieve these and other aspects of the present disclosure, as embodied and broadly described herein, an apparatus includes a display member configured to display an image, and a vibration apparatus at a rear surface of the display member, the vibration apparatus vibrates the display member by a driving signal based on a driving mode and vibrates the display member by a vibration signal based on a vibration mode.

In one or more aspects, a method of driving an apparatus includes a driving the vibration apparatus according to a driving signal based on a driving mode of the apparatus to vibrate the display member, and a driving the vibration apparatus according to a vibration signal based on a vibration mode of the apparatus to vibrate the display member.

In one or more aspects, a display apparatus includes display member configured to display an image a vibration apparatus disposed behind the display member and a controller. The controller can be configured to drive the vibration apparatus in a normal mode to output a sound or a haptic feedback and drive the vibration apparatus in a dent restoration mode to restore one or more dents or depressions in the display member.

An apparatus according to an embodiment of the present disclosure can vibrate a display member to output a sound in a forward direction of the display member, and thus, can enhance a sound characteristic and/or a sound pressure level characteristic.

An apparatus and a driving method thereof according to an embodiment of the present disclosure can recover a dent caused by a press of a display member, thereby enhancing the appearance quality of a screen.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with aspects of the disclosure.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this disclosure, illustrate embodiments of the disclosure and together with the description serve to explain principles of the disclosure

Figure 1:
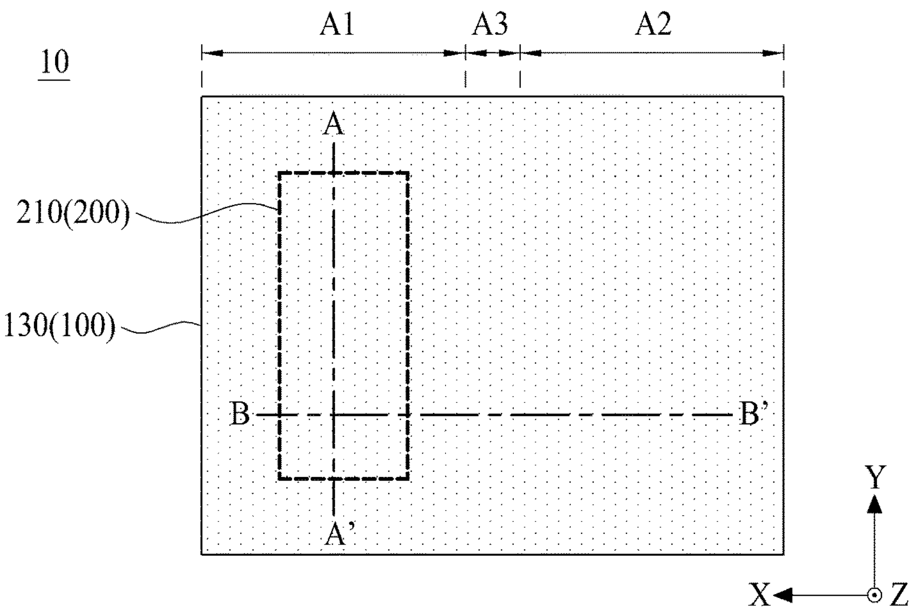
FIG. 1 illustrates an apparatus according to an embodiment of the present disclosure.

Throughout the drawings and the detailed description, unless otherwise described, the same drawing reference numerals should be understood to refer to the same elements, features, and structures. The relative size and depiction of these elements can be exaggerated for clarity, illustration, and/or convenience.

DETAILED DESCRIPTION OF THE EMBODIMENTS

Reference is now made in detail to embodiments of the present disclosure, examples of which can be illustrated in the accompanying drawings. In the following description, when a detailed description of well-known functions, structures or configurations can unnecessarily obscure aspects of the present disclosure, the detailed description thereof can have been omitted for brevity. Further, repetitive descriptions can be omitted for brevity. The progression of processing steps and/or operations described is a non-limiting example.

The sequence of steps and/or operations is not limited to that set forth herein and may be changed to occur in an order that is different from an order described herein, with the exception of steps and/or operations necessarily occurring in a particular order. In one or more examples, two operations in succession may be performed substantially concurrently, or the two operations may be performed in a reverse order or in a different order depending on a function or operation involved.

Unless stated otherwise, like reference numerals may refer to like elements throughout even when they are shown in different drawings. In one or more aspects, identical elements (or elements with identical names) in different drawings may have the same or substantially the same functions and properties unless stated otherwise. Names of the respective elements used in the following explanations are selected only for convenience and may be thus different from those used in actual products.

Advantages and features of the present disclosure, and implementation methods thereof, are clarified through the embodiments described with reference to the accompanying drawings. The present disclosure can, however, be embodied in different forms and should not be construed as limited to the embodiments set forth herein. Rather, these embodiments are examples and are provided so that this disclosure can be thorough and complete to assist those skilled in the art to understand the inventive concepts without limiting the protected scope of the present disclosure.

Shapes (e.g., sizes, lengths, widths, heights, thicknesses, locations, radii, diameters, and areas), ratios, angles, numbers, and the like disclosed herein, including those illustrated in the drawings are merely examples, and thus, the present disclosure is not limited to the illustrated details. Any implementation described herein as an “example” is not necessarily to be construed as preferred or advantageous over other implementations. It is, however, noted that the relative dimensions of the components illustrated in the drawings are part of the present disclosure.

When the term “comprise,” “have,” “include,” “contain.” “constitute.” “make of,” “formed of,” or the like with respect to one or more elements is used, one or more other elements can be added unless a term such as “only” or the like is used. The terms used in the present disclosure are merely used in order to describe example embodiments, and are not intended to limit the scope of the present disclosure. The terms of a singular form can include plural forms unless the context clearly indicates otherwise.

The word “exemplary” is used to mean serving as an example or illustration. Aspects are example aspects. “Embodiments,” “examples,” “aspects,” and the like should not be construed as preferred or advantageous over other implementations. An embodiment, an example, an example embodiment, an aspect, or the like may refer to one or more embodiments, one or more examples, one or more example embodiments, one or more aspects, or the like, unless stated otherwise. Further, the term “may” encompasses all the meanings of the term “can.”

In one or more aspects, unless explicitly stated otherwise, an element, feature, or corresponding information (e.g., a level, range, dimension, size, or the like) is construed to include an error or tolerance range even where no explicit description of such an error or tolerance range is provided. An error or tolerance range can be caused by various factors (e.g., process factors, internal or external impact, noise, or the like). In interpreting a numerical value, the value is interpreted as including an error range unless explicitly stated otherwise.

In describing a positional relationship, where the positional relationship between two parts (e.g., layers, films, regions, components, sections, or the like) is described, for example, using “on,” “upon,” “on top of,” “over,” “under,” “above,” “below,” “beneath,” “near,” “close to,” “adjacent to,” “beside,” “next to.” “at or on a side of,” or the like, one or more other parts can be located between the two parts unless a more limiting term, such as “immediate(ly),” “direct(ly),” or “close(ly),” is used. For example, when a structure is described as being positioned “on,” “on a top of,” “upon,” “on top of,” “over,” “under,” “above,” “below,” “beneath,” “near,” “close to,” “adjacent to,” “beside,” “next to,” “at or on a side of,” or the like another structure, this description should be construed as including a situation in which the structures contact each other as well as a situation in which one or more additional structures are disposed or interposed therebetween. Furthermore, the terms “front,” “rear,” “back,” “left,” “right,” “top,” “bottom,” “downward,” “upward,” “upper,” “lower,” “up,” “down,” “column,” “row,” “vertical,” “horizontal,” and the like refer to an arbitrary frame of reference.

Spatially relative terms, such as “below,” “beneath,” “lower,” “on,” “above,” “upper” and the like, can be used to describe a correlation between various elements (e.g., layers, films, regions, components, sections, or the like) as shown in the drawings. The spatially relative terms are to be understood as terms including different orientations of the elements in use or in operation in addition to the orientation depicted in the drawings. For example, if the elements shown in the drawings are turned over, elements described as “below” or “beneath” other elements would be oriented “above” other elements. Thus, the term “below,” which is an example term, can include all directions of “above” and “below.” Likewise, an exemplary term “above” or “on” can include both directions of “above” and “below.”

In describing a temporal relationship, when the temporal order is described as, for example, “after,” “subsequent,” “next,” and “before,” “preceding,” “prior to,” or the like, a situation that is not consecutive or not sequential can be included and thus one or more other events may occur therebetween, unless a more limiting term, such as “just,” “immediate(ly),” or “direct(ly)” is used.

The terms, such as “below,” “lower,” “above,” “upper” and the like, may be used herein to describe a relationship between element(s) as illustrated in the drawings. It will be understood that the terms are spatially relative and based on the orientation depicted in the drawings.

It is understood that, although the terms “first,” “second,” or the like can be used herein to describe various elements (e.g., layers, films, regions, components, sections, or the like), these elements should not be limited by these terms. These terms are used only to distinguish one element from another. For example, a first element could be a second element, and, similarly, a second element could be a first element, without departing from the scope of the present disclosure. Furthermore, the first element, the second element, and the like can be arbitrarily named according to the convenience of those skilled in the art without departing from the scope of the present disclosure. For clarity, the functions or structures of these elements (e.g., the first element, the second element and the like) are not limited by ordinal numbers or be names in front of the elements. Further, a first element may include one or more first elements. Similarly, a second element or the like may include one or more second elements or the like.

In describing elements of the present disclosure, the terms “first,” “second,” “A,” “B,” “(a),” “(b),” or the like can be used. These terms are intended to identify the corresponding element(s) from the other element(s), and these are not used to define the essence, basis, order, or number of the elements.

For the expression that an element (e.g., layer, film, region, component, section, or the like) is “connected,” “coupled,” “attached,” “adhered,” or the like to another element, the element can not only be directly connected, coupled, attached, adhered, or the like to another element, but also be indirectly connected, coupled, attached, adhered, or the like to another with one or more intervening elements disposed or interposed between the elements, unless otherwise specified.

For the expression that an element (e.g., layer, film, region, component, section, or the like) “contacts,” “overlaps,” or the like with another element, the element can not only directly contact, overlap, or the like with another element, but can also indirectly contact, overlap, or the like with another element with one or more intervening elements disposed or interposed between the elements, unless otherwise specified.

The phase that an element (e.g., layer, film, region, component, section, or the like) is “provided in,” “disposed in,” or the like in another element may be understood as that at least a portion of the element is provided in, disposed in, or the like in another element, or that the entirety of the element is provided in, disposed in, or the like in another element. The phase that an element (e.g., layer, film, region, component, section, or the like) “contacts,” “overlaps,” or the like with another element may be understood as that at least a portion of the element contacts, overlaps, or the like with a least a portion of another element, that the entirety of the element contacts, overlaps, or the like with a least a portion of another element, or that at least a portion of the element contacts, overlaps, or the like with the entirety of another element.

The terms such as a “line” or “direction” should not be interpreted only based on a geometrical relationship in which the respective lines or directions are parallel or perpendicular to each other, and can be meant as lines or directions having wider directivities within the range within which the components of the present disclosure can operate functionally. For example, the terms “first direction,” “second direction,” and the like, such as a direction parallel or perpendicular to “x-axis,” “y-axis,” or “z-axis,” should not be interpreted only based on a geometrical relationship in which the respective directions are parallel or perpendicular to each other, and may be meant as directions having wider directivities within the range within which the components of the present disclosure can operate functionally.

The term “at least one” should be understood as including any and all combinations of one or more of the associated listed items. For example, each of the phrases of “at least one of a first item, a second item, or a third item” and “at least one of a first item, a second item, and a third item” may represent (i) a combination of items provided by two or more of the first item, the second item, and the third item or (ii) only one of the first item, the second item, or the third item.

The expression of a first element, a second elements “and/or” a third element should be understood as one of the first, second and third elements or as any or all combinations of the first, second and third elements. By way of example, A, B and/or C can refer to only A; only B; only C; any of A, B, and C (e.g., A, B, or C); or some combination of A B, and C (e.g., A and B; A and C; or B and C); or all of A, B, and C. Furthermore, an expression “A/B” can be understood as A and/or B. For example, an expression “A/B” can refer to only A, only B; A or B; or A and B.

In one or more aspects, the terms “between” and “among” can be used interchangeably simply for convenience unless stated otherwise. For example, an expression “between a plurality of elements” can be understood as among a plurality of elements. In another example, an expression “among a plurality of elements” can be understood as between a plurality of elements. In one or more examples, the number of elements can be two. In one or more examples, the number of elements can be more than two. Furthermore, when an element (e.g., layer, film, region, component, sections, or the like) is referred to as being “between” at least two elements, the element may be the only element between the at least two elements, or one or more intervening elements may also be present.

In one or more aspects, the phrases “each other” and “one another” can be used interchangeably simply for convenience unless stated otherwise. For example, an expression “different from each other” can be understood as being different from one another. In another example, an expression “different from one another” can be understood as being different from each other. In one or more examples, the number of elements involved in the foregoing expression can be two. In one or more examples, the number of elements involved in the foregoing expression can be more than two.

In one or more aspects, the phrases “one or more among” and “one or more of” can be used interchangeably simply for convenience unless stated otherwise.

The term “or” means “inclusive or” rather than “exclusive or.” That is, unless otherwise stated or clear from the context, the expression that “x uses a or b” means any one of natural inclusive permutations. For example, “a or b” may mean “a,” “b,” or “a and b,” For example, “a, b or c” may mean “a,” “b,” “c,” “a and b,” “b and c,” “a and c,” or “a, b and c.”

Features of various embodiments of the present disclosure can be partially or entirety coupled to or combined with each other, can be technically associated with each other, and can be variously inter-operated, linked or driven together. The embodiments of the present disclosure can be implemented or carried out independently of each other, or can be implemented or carried out together in a co-dependent or related relationship. In one or more aspects, the components of each apparatus according to various embodiments of the present disclosure are operatively coupled and configured.

Unless otherwise defined, the terms (including technical and scientific terms) used herein have the same meaning as commonly understood by one of ordinary skill in the art to which example embodiments belong. It is further understood that terms, such as those defined in commonly used dictionaries, should be interpreted as having a meaning that is, for example, consistent with their meaning in the context of the relevant art and should not be interpreted in an idealized or overly formal sense unless expressly defined otherwise herein.

The terms used herein have been selected as being general in the related technical field; however, there may be other terms depending on the development and/or change of technology, convention, preference of technicians, and so on. Therefore, the terms used herein should not be understood as limiting technical ideas, but should be understood as examples of the terms for describing example embodiments.

Further, in a specific case, a term may be arbitrarily selected by an applicant, and in this case, the detailed meaning thereof is described herein. Therefore, the terms used herein should be understood based on not only the name of the terms, but also the meaning of the terms and the content hereof.

In the following description, various example embodiments of the present disclosure are described in detail with reference to the accompanying drawings. With respect to reference numerals to elements of each of the drawings, the same elements can be illustrated in other drawings, and like reference numerals can refer to like elements unless stated otherwise. The same or similar elements may be denoted by the same reference numerals even though they are depicted in different drawings. In addition, for convenience of description, a scale, dimension, size, and thickness of each of the elements illustrated in the accompanying drawings can be different from an actual scale, dimension, size, and thickness, and thus, embodiments of the present disclosure are not limited to a scale, dimension, size, and thickness illustrated in the drawings.

Figure 2:
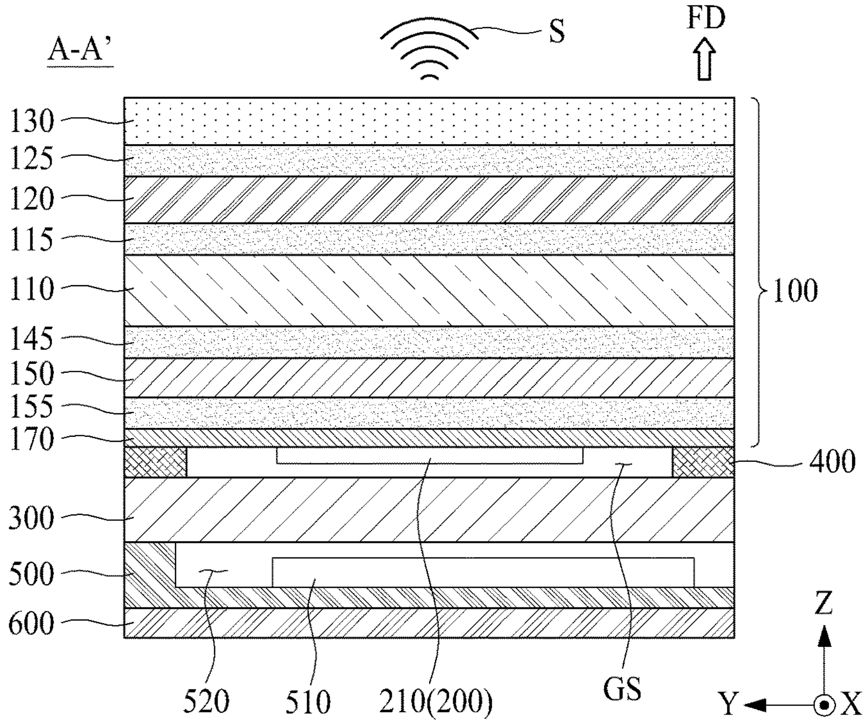
FIG. 2 is a cross-sectional view taken along line A-A' of FIG. 1 according to an embodiment of the present disclosure.
Figure 3:
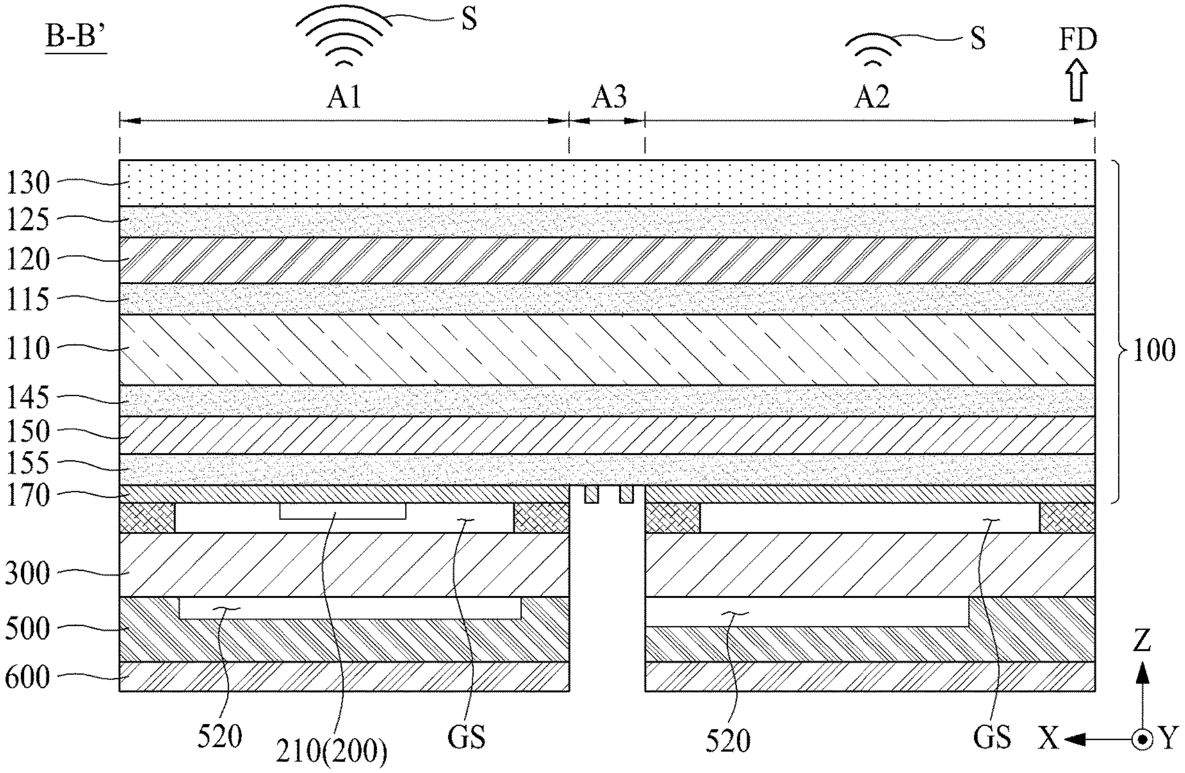
FIG. 3 is a cross-sectional view taken along line B-B' of FIG. 1 according to an embodiment of the present disclosure.

FIG. 1 illustrates an apparatus according to an embodiment of the present disclosure. FIG. 2 is a cross-sectional view taken along line A-A' of FIG. 1 according to an embodiment of the present disclosure. FIG. 3 is a cross-sectional view taken along line B-B' of FIG. 1 according to an embodiment of the present disclosure.

With reference to FIGS. 1 to 3, an apparatus 10 according to an embodiment of the present disclosure can be a display apparatus (or a flexible display device), but embodiments of the present disclosure are not limited thereto.

The display apparatus can include a display panel, which includes a plurality of pixels configuring a black/white or color image, and a driver for driving the display panel. The pixels can be a subpixel which implements one of a plurality of colors configuring a color image. The apparatus according to an embodiment of the present disclosure can include a set electronic apparatus or a set device (or a set apparatus) such as a notebook computer, a television, a computer monitor, an equipment apparatus including an automotive apparatus or another type apparatus for vehicles, or a mobile electronic apparatus such as a smartphone, a foldable phone, a rollable phone, or an electronic pad, or the like, which is a complete product (or a final product) including a liquid crystal display panel, an inorganic light emitting display panel, or an organic light emitting display panel, or the like.

The apparatus 10 according to an embodiment of the present disclosure can include a display member 100 and a vibration apparatus 200.

The display member 100 can display an image, for example, an electronic image, a digital image, a still image, or a video image, or the like. For example, the display member 100 can include a display panel 110 which can display an image by outputting light.

The display panel 110 can be a curved display panel or one of all types of display panels, such as a liquid crystal display panel, an organic light emitting display panel, a quantum dot light emitting display panel, a micro light emitting diode display panel, and an electrophoretic display panel. The display panel 110 can be a flexible display panel. For example, the display panel 110 can be a flexible light emitting display panel, a flexible electrophoretic display panel, a flexible electro-wetting display panel, a flexible light emitting diode display panel, or a flexible quantum dot light emitting display panel, but embodiments of the present disclosure are not limited thereto.

The display panel 110 or the display member 100 according to an embodiment of the present disclosure can include a display area which displays an image based on driving of a plurality of pixels. The display panel 110 can include a non-display area which surrounds the display area. The display area can include a first display area A1, a second display area A2, and a third display area A3 between the first display area A1 and the second display area A2. For example, with respect to a first direction X, the first display area A1 can be a first area, a left area, or a left display area, the second display area A2 can be a second area, a right area, or a right display area, and the third display area A3 can be a third area, a middle area, a middle display area, a folding area, or a folding display area, but embodiments of the present disclosure are not limited thereto. The display member 100 or the display panel 110 can be bent or folded at a certain curvature with respect to the third display area A3, and thus, the apparatus 10 according to an embodiment of the present disclosure can be a foldable apparatus or a flexible apparatus. Hereinafter, an example where the apparatus 10 is the foldable apparatus will be described.

The display panel 110 according to an embodiment of the present disclosure can include a first substrate, a second substrate, and a liquid crystal layer. The first substrate can be an upper substrate or a thin film transistor (TFT) array substrate. For example, the display panel 110 can include the first substrate including a TFT which is a switching element for adjusting a light transmittance of each pixel, the second substrate including a color filter and/or a black matrix, or the like, and a liquid crystal layer formed between the first substrate and the second substrate. For example, the first substrate can include a pixel array portion (or a display portion or a display area) including a plurality of pixels which are respectively provided in a plurality of pixel areas configured by intersections between a plurality of gate lines and/or a plurality of data lines. Each of the plurality of pixels can include a TFT connected to a gate line and/or a data line, a pixel electrode connected to the TFT, and a common electrode which is provided adjacent to the pixel electrode and is supplied with a common voltage.

The first substrate can further include a pad portion provided at a first periphery (or a first non-display portion) thereof and a gate driving circuit provided at a second periphery (or a second non-display portion) thereof.

The pad portion can transfer a signal, supplied from the outside, to the pixel array portion and/or the gate driving circuit. For example, the pad portion can include a plurality of data pads connected to a plurality of data lines through a plurality of data link lines and/or a plurality of gate input pads connected to the gate driving circuit through a gate control signal line. For example, a size of the first substrate can be greater than a size of the second substrate, but embodiments of the present disclosure are not limited thereto.

The gate driving circuit can be embedded (or integrated) into the second periphery of the first substrate and can be connected to the plurality of gate lines. For example, the gate driving circuit can be implemented with a shift register including a transistor, which is formed through the same process as the TFT provided in the pixel area. According to another embodiment of the present disclosure, the gate driving circuit can be implemented as an integrated circuit (IC) and can be included in a panel driving circuit, without being embedded into the first substrate.

The second substrate can be a lower substrate or a color filter array substrate. For example, the second substrate can include a pixel pattern (or a pixel defining pattern, including an opening area overlapping the pixel area formed in the second substrate, and a color filter layer formed at the opening area. The second substrate can have a size which is smaller than the first substrate, but embodiments of the present disclosure are not limited thereto. For example, the second substrate can overlap a portion, other than the first periphery, of the first substrate. The second substrate can be bonded to a portion, other than the first edge, of the first substrate with a liquid crystal layer therebetween by a sealant.

The liquid crystal layer can be disposed between the first substrate and the second substrate. The liquid crystal layer can include a liquid crystal including liquid crystal molecules where an alignment direction thereof is changed based on an electric field generated by the common voltage and a data voltage applied to a pixel electrode for each pixel.

The display panel 110 according to an embodiment of the present disclosure can drive the liquid crystal layer based on the electric field which is generated in each pixel by the data voltage and the common voltage applied to each pixel, and thus, can display an image based on light passing through the liquid crystal layer.

In the display panel 110 according to another embodiment of the present disclosure, the first substrate can be the color filter array substrate, and the second substrate can be the TFT array substrate. For example, the display panel 110 according to another embodiment of the present disclosure can have a type where the display panel 110 is vertically reversed, but embodiments are not limited thereto. For example, a pad portion of the display panel 110 according to another embodiment of the present disclosure can be covered by a separate mechanism (or a separate structure).

When the display panel 110 is an organic light emitting display panel, the display panel 110 can include a plurality of gate lines, a plurality of data lines, and a plurality of pixels respectively provided in a plurality of pixel areas defined by intersections of the gate lines and the data lines. In addition, the display panel 110 can include an array substrate including a TFT which is an element for selectively applying a voltage to each of the pixels, an organic light emitting device layer on the array substrate, and an encapsulation portion or an encapsulation substrate disposed over the array substrate to overlay the organic light emitting device layer. The encapsulation substrate can protect the TFT and the organic light emitting device layer from an external impact and can prevent water or oxygen from penetrating into the organic light emitting device layer. In addition, the organic light emitting device layer provided over the array substrate can be changed to an inorganic light emitting layer (e.g., a nano-sized material layer, a quantum dot, or the like). As for other embodiments of the present disclosure, the organic light emitting device layer provided over the array substrate can be changed to a micro light emitting diode.

The display panel 110 according to an embodiment of the present disclosure can include an anode electrode, a cathode electrode, and a light emitting device, and can be configured to display an image in a type such as a top emission type, a bottom emission type, or a dual emission type or the like, based on a structure of a pixel array portion which includes a plurality of pixels. In the top emission type, visible light emitted from the pixel array portion can be irradiated in a forward direction of a base substrate to allow an image to be displayed, and in the bottom emission type, the visible light emitted from the pixel array portion can be irradiated in a rearward region of the base substrate to allow an image to be displayed.

The display panel 110 according to an embodiment of the present disclosure can include a pixel array portion disposed over a substrate (or a flexible substrate). The pixel array portion can include a plurality of pixels which display an image based on a signal supplied through each of signal lines. The signal lines can include a gate line, a data line, and a pixel driving power line, or the like, but embodiments of the present disclosure are not limited thereto.

The substrate of the display panel 110 can include a plastic material, but embodiments of the present disclosure are not limited thereto. The substrate of the display panel 110 can include polyimide (PI), polyethylene terephthalate (PET), polycarbonate (PC), polyarylate (PAR), polyethylene naphthalate (PEN), polysulfone (PSF), polyethersulfone (PES), and cyclo-olefin copolymer (COC), or the like, but embodiments of the present disclosure are not limited thereto, and the substrate can be configured as thin glass capable of being folded or bent.

Each of the plurality of pixels can include a pixel circuit layer including a driving TFT provided at a pixel area which is configured by a plurality of gate lines and/or a plurality of data lines, an anode electrode electrically connected to the driving TFT, a light emitting device formed over the anode electrode, and a cathode electrode electrically connected to the light emitting device.

The driving TFT can be configured at a transistor region of each pixel area provided over the substrate. The driving TFT can include a gate electrode, a gate insulation layer, a semiconductor layer, a source electrode, and a drain electrode. The semiconductor layer of the driving TFT can include silicon such as amorphous silicon (a-Si), polysilicon (poly-Si), or low temperature poly-Si, or the like, or can include oxide such as indium-gallium-zinc-oxide (IGZO), or the like, but embodiments of the present disclosure are not limited thereto.

The anode electrode (or a pixel electrode) can be provided at the opening region disposed at each pixel area and can be electrically connected to the driving TFT.

The light emitting device according to an embodiment of the present disclosure can include an organic light emitting device layer provided over the anode electrode. The organic light emitting device layer can be implemented so that pixels emit light of the same color (e.g., white light) for each pixel or emit lights of different colors (e.g., red light, green light, and blue light) for each pixel. The cathode electrode (or a common electrode) can be connected to the organic light emitting device layer provided at each pixel area in common. For example, the organic light emitting device layer can include a single structure, where includes the same color for each pixel, or a stack structure which includes two or more structures. As another embodiment of the present disclosure, the organic light emitting device layer can include a stack structure which includes two or more structures including one or more different colors for each pixel. The two or more structures including one or more different colors can be configured with one or more of blue, red, yellow-green, and green or a combination thereof, but embodiments of the present disclosure are not limited thereto. For example, an embodiment of the combination can be blue and red, red and yellow-green, red and green, and red/yellow/green, or the like, but embodiments of the present disclosure are not limited thereto, an embodiment of the present disclosure can be applied regardless of a stack order thereof. A stack structure including two or more structures having the same color or one or more different colors can further include a charge generating layer between two or more structures. The charge generating layer can have a PN junction structure and can include an N-type charge generating layer and a P-type charge generating layer.

The light emitting device according to another embodiment of the present disclosure can include a micro light emitting diode device which is electrically connected to each of the anode electrode and the cathode electrode. The micro light emitting diode device can be a light emitting diode implemented as an integrated circuit (IC) type or a chip type. The micro light emitting diode device can include a first terminal electrically connected to the anode electrode and a second terminal electrically connected to the cathode electrode. The cathode electrode can be connected to a second terminal of the micro light emitting diode device provided at each pixel area in common. As another embodiment of the present disclosure, the light emitting device can include a quantum dot light emitting layer, but embodiments of the present disclosure are not limited thereto.

The encapsulation portion can be formed over the substrate to surround the pixel array portion, and thus, can prevent oxygen or water from penetrating into the light emitting device layer of the pixel array portion. The encapsulation portion according to an embodiment of the present disclosure can be formed in a multi-layer structure where an organic material layer and an inorganic material layer are alternately stacked, but embodiments of the present disclosure are not limited thereto. The inorganic material layer can prevent oxygen or water from penetrating into the light emitting device layer of the pixel array portion. The organic material layer can be formed to have a thickness which is relatively thicker than the inorganic material layer, to overlay particles occurring in a manufacturing process, but embodiments of the present disclosure are not limited thereto. For example, the encapsulation portion can include a first inorganic layer, an organic layer over the first inorganic layer, and a second inorganic layer over the organic layer. The organic layer can be a particle covering layer, but the terms are not limited thereto. Hereinafter, an example where the display panel 110 is an organic light emitting display panel will be described, but embodiments of the present disclosure are not limited thereto.

The display member 100 according to an embodiment of the present disclosure can further include a front member 130 and a rear member 170.

The front member 130 can be disposed at a front surface (or a forward surface) of the display panel 110. The front member 130 can transfer an image displayed by the display panel 110 to the outside and can protect the display panel 110. For example, the front member 130 can protect the display panel 110 from an external impact or stress and can prevent the occurrence of damage. The front member 130 can be implemented with a ductile plastic-based cover capable of being folded for the thinness and flexibility of the apparatus 10, but embodiments of the present disclosure are not limited thereto. For example, the front member 130 can be a cover window or a window cover, or the like, but embodiments of the present disclosure are not limited thereto.

According to an embodiment of the present disclosure, a protection film can be further disposed at a front surface of the front member 130. The front member 130 can be formed to have a thin thickness of several tens μm, and due to this, the front member 130 may be damaged by an external weak impact or continuous folding. The protection film can protect the front member 130 from a compression stress and a tensile stress based on an external impact or continuous folding. When glass powders or small shards occur because the front member 130 is damaged by an external impact or a stress, the protection film can prevent the glass powders from being scattered. For example, the protection film can include a film such as polyethylene terephthalate, polyurethane, triacetylcellulose, cyclo-olefin polymer (COP), or a combination material thereof, but embodiments of the present disclosure are not limited thereto.

According to another embodiment of the present disclosure, a touch panel configuring a touch sensor can be further disposed between the display panel 110 and the front member 130. For example, the touch panel can include a touch electrode layer which is provided over the display panel 110 and includes a touch electrode for sensing a finger touch or a pen touch applied to the display panel 110. The touch electrode layer can sense a capacitance variation of the touch electrode based on a user touch. For example, a mutual-capacitance type where a plurality of touch driving electrodes and a plurality of touch sensing electrodes are configured to intersect, or a self-capacitance type where only a plurality of touch sensing electrodes are arranged can be applied, and an adhesive layer can be disposed over a top surface or a bottom surface and can be attached on and fixed to an upper element or a lower element. The touch panel can be disposed over an encapsulation portion of the display panel 110, or can be disposed at a rear surface of a pixel array portion or in the pixel array portion.

The rear member 170 can be can be disposed under the display panel 110. The rear member 170 can be configured or disposed to support the display panel 110. For example, the rear member 170 can additionally support a flexible substrate so that the flexible substrate configuring the display panel 110 does not overlay and can protect elements disposed over the flexible substrate from external moisture, heat, and impact. In addition, the rear member 170 can increase the stiffness of the display panel 110.

The rear member 170 can include a metal material. For example, the rear member 170 can include a metal material, such as stainless steel (SUS), stainless steel (SUS) including other metals such as nickel (Ni), iron (Fe), aluminum (Al)-based, or magnesium (Mg), but embodiments of the present disclosure are not limited thereto. For example, when the rear member 170 includes stainless steel (SUS), the stainless steel (SUS) can have a high restoring force and high stiffness, and thus, can maintain high stiffness even when a thickness of the rear member 170 is reduced. Therefore, the rear member 170 can support the display panel 110 and can decrease a total thickness of the apparatus 10, and thus, can reduce a curvature radius of a folding region.

The rear member 170 according to an embodiment of the present disclosure can be configured to overlap each of the first display area A1 and the second display area A2 of the display panel 110 or the display member 100. For example, the rear member 170 can be configured to overlap with each of the other first display area A1 and second display area A2, except for a third display area A3, of the display area of the display panel 110. The rear member 170 can be divided at a region overlapping the third display area A3 of the display panel 110 or the display member 100. For example, the rear member 170 can include a first rear member overlapping with the first display area A1 of the display member 100 and a second rear member overlapping with the second display area A2 of the display member 100.

The rear member 170 according to another embodiment of the present disclosure can be configured to overlap with all of the first, second and third display areas A1, A2 and A3 of the display panel 110 or the display member 100. For example, the rear member 170 can be configured to cover an entire rear surface of the display panel 110. For example, the rear member 170 can be configured to have the same size as the display panel 110.

The rear member 170 according to another embodiment of the present disclosure can include one or more holes, slits or perforations overlapping with the third display area A3 of the display panel 110 or the display member 100. For example, the one or more holes or silts can be formed to pass through the rear member 170 and overlap with the third display area A3 of the display member 100, and thus, can provide flexibility in a region of the rear member 170 overlapping the third display area A3 of the display member 100.

Figure 4:
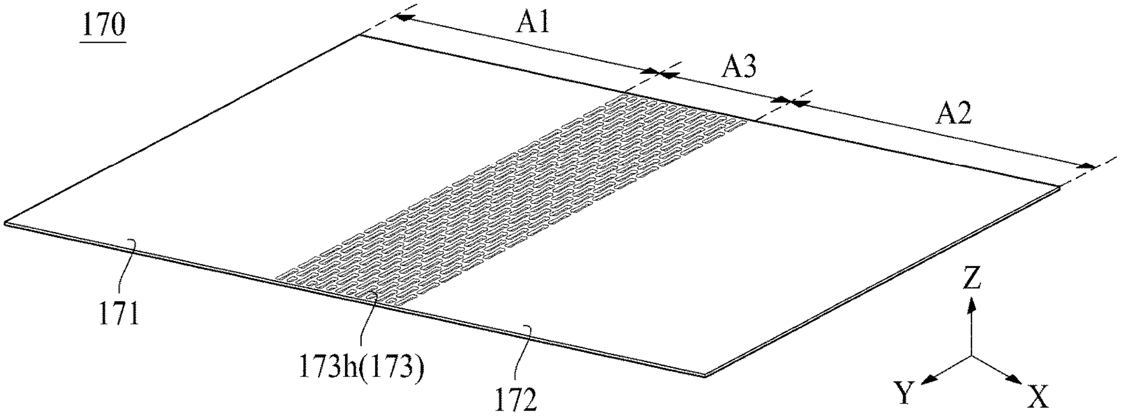
FIG. 4 illustrates a rear member illustrated in FIGS. 2 and 3 according to an embodiment of the present disclosure.

The rear member 170 according to another embodiment of the present disclosure, as illustrated in FIG. 4, can include a first supporting part 171, a second supporting part 172, and a pattern part 173.

The first supporting part 171 can be connected or coupled to a rear surface of the display member 100 to overlap with the first display area A1 of the display member 100. The first supporting part 171 can have a flat structure. The first supporting part 171 can support the first display area A1 of the display member 100 and can increase the stiffness or flatness of the first display area A1. The first supporting part 171 can have a flat structure.

The second supporting part 172 can be connected or coupled to the rear surface of the display member 100 to overlap with the second display area A2 of the display member 100. The second supporting part 172 can have a flat structure. The second supporting part 172 can support the second display area A2 of the display member 100 and can increase the stiffness or flatness of the second display area A2.

The pattern part 173 can be connected or coupled to the rear surface of the display member 100 to overlap with the third display area A3 of the display member 100. The pattern portion 173 can increase the flatness of the third display area A3.

The pattern part 173 can include a plurality of holes or slits (or pattern holes) 173*h*. The plurality of holes 173*h* can be configured so that the pattern part 173 is bent or folded together with bending or folding of the display member 100. For example, each of the plurality of holes 173*h* can include a tetragonal shape having a certain width and a certain length, but embodiments of the present disclosure are not limited thereto. For example, each of the plurality of holes 173*h* can include a tetragonal shape having a certain width parallel to a first direction X and a certain length parallel to a second direction Y. For example, the plurality of holes 173*h* can be arranged in a zigzag shape or a curvy shape. Accordingly, the pattern part 173 can be bent or folded by the plurality of holes 173*h* together with bending or folding of the display member 100.

The other region, except the plurality of holes 173*h*, of a region of the pattern part 173 can support the third display area A3 of the display member 100. Accordingly, the pattern part 173 can increase the flatness of the third display area A3, and based on bending or folding, a restoring force (or an elastic restoring force) against creases occurring at the third display area A3 can be improved. The pattern part 173 can be a hole pattern part, a mesh part, a mesh plate, or a pattern plate, but embodiments of the present disclosure are not limited thereto.

Referring to FIGS. 1 to 3, the display member 100 can further include a polarization member 120 between the front member 130 and the display panel 110.

The polarization member 120 can polarize light, emitted from the display panel 110, at a polarization angle. The polarization member 120 can discharge light, polarized at the polarization angle, to the outside. The polarization member 120 can have a function of preventing the reflection of light, except the light polarized at the polarization angle, of external light. For example, the polarization member 120 can transmit only the light traveling in a polarization direction, of the external light incident from the outside and can absorb or block the other non-polarized light, and light passing through the polarization member 120 can be reflected by the display panel 110 and can be incident on the polarization member 120 again. At this time, a polarization direction of the reflected external light can be changed, and thus, the light which is incident on the polarization member 120 again can be absorbed or blocked by the polarization member 120 and can not be output to the outside, thereby preventing the reflection of the external light. Accordingly, the polarization member 120 can prevent the reflection of light input from the outside to secure the visibility of the display panel 110.

According to an embodiment of the present disclosure, the polarization member 120 can include a circular polarizer. When the polarization member 120 is the circular polarizer, a phase difference film disposed between the display panel 110 and the polarization member 120 can be further configured. For example, a $\lambda/4$ phase retardation film can be further configured between the polarization member 120 and the display panel 110.

According to an embodiment of the present disclosure, the polarization member 120 can be attached on the display panel 110 by a first adhesive member (or a first adhesive layer or a first adhesive) 115. For example, the polarization member 120 can be attached on a front surface of the display panel 110 by the first adhesive member 115. The first adhesive member 115 can be configured between the display panel 110 and the polarization member 120. For example, the first adhesive member 115 can include an adhesive material, such an optically cleared adhesive (OCA), an optically cleared resin (OCR), or a pressure sensitive adhesive (PSA), or the like, but embodiments of the present disclosure are not limited thereto.

The front member 130 can be attached on the polarization member 120 by a second adhesive member (or a second adhesive layer or a second adhesive) 125. For example, the front member 130 can be attached on a front surface of the polarization member 120 by the second adhesive member 125. The second adhesive member 125 can be configured between the front member 130 and the polarization member 120. For example, the second adhesive member 125 can include an adhesive material, such an optically cleared adhesive (OCA), an optically cleared resin (OCR), or a pressure sensitive adhesive (PSA), or the like, but embodiments of the present disclosure are not limited thereto. For example, the second adhesive member 125 can include an adhesive material which is the same as or different from the first adhesive member 115.

The display member 100 according to an embodiment of the present disclosure can further include a middle member 150 between the display panel 110 and the rear member 170.

The middle member 150 can be attached on a rear surface (or a backside surface) of the display panel 110 by a third adhesive member (or a third adhesive layer or a third adhesive) 145, and thus, can primarily support the display panel 110. For example, the middle member 150 can support the display panel 110 together with the rear member 170. When the display member 100 is a foldable display member, the middle member 150 can maintain a constant curvature of the display member 100 (or the display panel 110) when the foldable display member is folded in multi-folding and can prevent the occurrence of creases of a top surface (or an upper surface) of the display panel 110. For example, the middle member 150 can be a first rear supporting member, a first supporting member, a first supporting substrate, or a first supporting plate, but embodiments of the present disclosure are not limited thereto.

The middle member 150 according to an embodiment of the present disclosure can include polyethylene terephthalate, acrylonitrile-butadiene-styrene, polyvinylalcohol, cyclo-olefin copolymer, polyurethane, polysulfone, polymethyl methacrylate, polyarylate, polyethylene naphthalate, polycarbonate, or polyethersulfone, or the like, but embodiments of the present disclosure are not limited thereto, and middle member 150 can be configured as thin glass capable of being folded or bent.

The third adhesive member 145 can include an adhesive material, such an optically cleared adhesive (OCA), an optically cleared resin (OCR), or a pressure sensitive adhesive (PSA), or the like, but embodiments of the present disclosure are not limited thereto. For example, the third adhesive member 145 can include an adhesive material which is the same as or different from one or more of the first adhesive member 115 and the second adhesive member 125.

The rear member 170 can be attached on a rear surface (or a backside surface) of the middle member 150 by a fourth adhesive member 155 (or a fourth adhesive layer or a fourth adhesive), and thus, can support the display panel 110 together with the middle member 150. For example, the rear member 170 can be a second rear supporting member, a second supporting member, a second supporting substrate, or a second supporting plate, but embodiments of the present disclosure are not limited thereto.

The fourth adhesive member 155 can include an adhesive material, such an optically cleared adhesive (OCA), an optically cleared resin (OCR), or a pressure sensitive adhesive (PSA), or the like, but embodiments of the present disclosure are not limited thereto. For example, the fourth adhesive member 155 can include an adhesive material which is the same as or different from one or more of the first to third adhesive members 115, 125, and 145.

The vibration apparatus 200 can be configured to vibrate the display member 100. The vibration apparatus 200 can be disposed at or connected to the rear surface of the display member 100. A center portion of the vibration apparatus 200 can be disposed at a center portion of the first display area A1, but embodiments of the present disclosure are not limited thereto. For example, the center portion of the vibration apparatus 200 can be spaced apart from the center portion of the first display area A1. For example, a size of the vibration apparatus 200 can be greater than half of a size of the first display area A1 and can be smaller than a total size of the first display area A1, but embodiments of the present disclosure are not limited thereto.

The vibration apparatus 200 can vibrate the display member 100, based on a driving mode, and thus, the vibration apparatus 200 can provide a user with one or more of a sound S and/or a haptic feedback based on a vibration of the display member 100. For example, the vibration apparatus 200 can vibrate based on a vibration driving signal synchronized with an image displayed by the display member 100 to vibrate the display member 100. For example, the vibration apparatus 200 can be configured to vibrate based on a driving signal including a sound signal in the driving mode. For example, the vibration apparatus 200 can be configured to vibrate based on a driving signal including one or more of the sound signal and a haptic feedback signal in the driving mode, based on one or more of a sound source signal and a user touch. For example, the vibration apparatus 200 can be configured to vibrate based on a driving signal including a frequency of an audible frequency band in the driving mode. For example, the driving mode can be a first driving mode, a complex vibration mode, a normal mode, or a sound output mode.

The vibration apparatus 200 can vibrate the display member 100 to help restore the original shape of various layers, based on a vibration mode, and thus, the vibration apparatus 200 can restore a dent (or an indentation or a pressed mark) which occurs in the display member 100 due to a press of a display apparatus (or a screen) caused by a finger or a touch pen or the like.

Figure 5A:
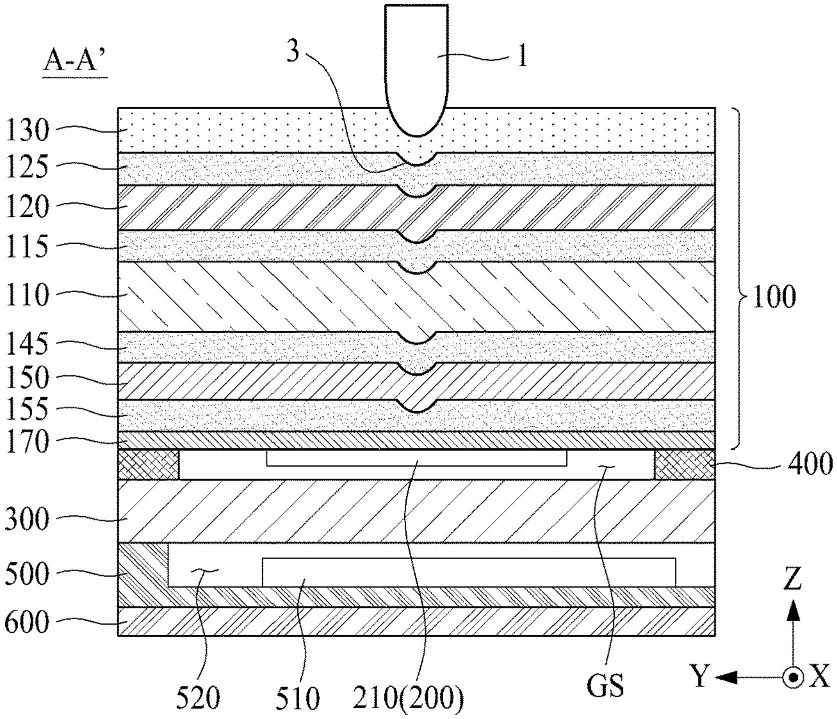
FIG. 5A illustrates a dent generated in the display member by pressing a touch pen on an apparatus according to an embodiment of the present disclosure.
Figure 5B:
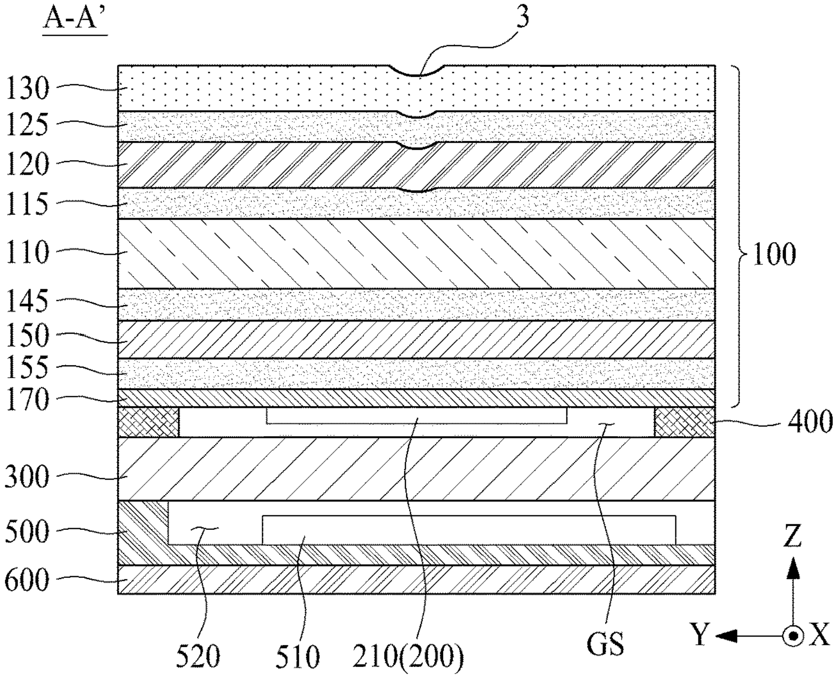
FIG. 5B illustrates a natural restoration of a dent in an apparatus according to an embodiment of the present disclosure.
Figure 5C:
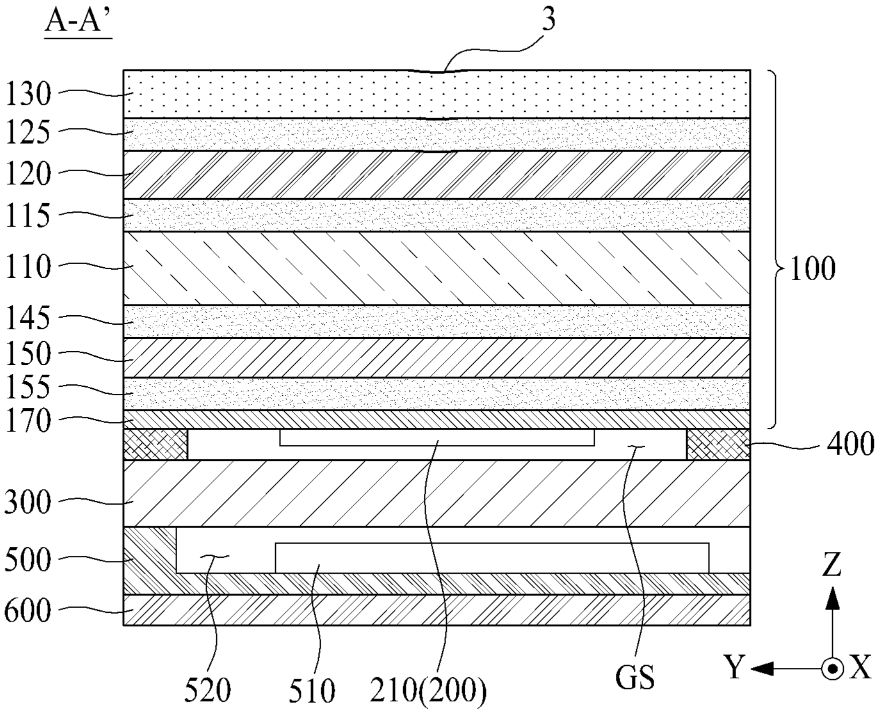
FIG. 5C illustrates a restoration of a dent based on a vibration mode of a vibration apparatus in an apparatus according to an embodiment of the present disclosure.

According to an embodiment of the present disclosure, the display member 100 can include a ductile and thin material, based on the lightness and slimness of an apparatus, and thus, as illustrated in FIG. 5A, a dent 3 can occur in the display member 100 due to a press, such as a finger touch or a pen touch 1 or the like of a user applied to the display member 100 (or the screen). For example, the display member 100 can include ductile materials 110, 120, 130, and 150 and adhesive members 115, 125, 145, and 155, and thus, the dent 3 can occur in the display member 100 due to a press, such as the finger touch or the pen touch 1 or the like of the user, based on a ductile characteristic of each of the ductile materials 110, 120, 130, and 150 and the adhesive members 115, 125, 145, and 155. A portion of the dent 3 occurring in the display member 100 can be restored (or recovered) after a certain time elapses, based on the amount of natural restoration (or the amount of natural recovery) by the flexibility or restoring force (or elastic restoring force) of each of the ductile materials 110, 120, 130, and 150 and the adhesive members 115, 125, 145, and 155, but as illustrated in FIG. 5B, can be recognized by a viewer, causing a degradation in quality of an image displayed by the display member 100 and a reduction in reliability of the display member 100. Accordingly, as illustrated in FIG. 5C, the vibration apparatus 200 can vibrate the display member 100 to restore (or recover) the dent 3 which occurs in the display member 100 due to a press, such as the finger touch or the pen touch 1 or the like of the user.

The vibration apparatus 200 can vibrate the display member 100 according to a vibration signal based on the vibration mode, and thus, can increase the flexibility or restoring force (or elastic restoring force) of each of the ductile materials 110, 120, 130, and 150 and the adhesive members 115, 125, 145, and 155, thereby restoring (or recovering) the dent which occurs in the display member 100 due to a press, such as the finger touch or the pen touch or the like of the user. A vibration of the vibration apparatus 200 based on the vibration mode can increase a displacement width (or a vibration width) of the display member 100, and thus, can increase the amount of restoration (or the amount of recovery) of each of the ductile materials 110, 120, 130, and 150 and the adhesive members 115, 125, 145, and 155, thereby increasing a restoration (or recovery) characteristic against the dent which occurs in the display member 100 due to a press, such as the finger touch or the pen touch or the like of the user and shortening a restoration (or recovery) time. For example, the vibration apparatus 200 can be configured to vibrate based on a vibration signal having a single frequency in the vibration mode. For example, the vibration mode can be a second driving mode, a simple vibration mode, a restoration mode, a recovery mode, a dent restoration mode, a dent recovery mode, an indentation restoration mode, or a non-sound mode.

According to an embodiment of the present disclosure, the flexibility or restoring force (or elastic restoring force) of each of the ductile materials 110, 120, 130, and 150 and the adhesive members 115, 125, 145, and 155 can increase as a displacement width (or a vibration width or a driving width) of the vibration apparatus 200 (or the display member 100) increases. The vibration apparatus 200 can have a largest displacement width (or a vibration width or a driving width) in a resonance frequency band (or a natural frequency band) thereof, and thus, when the vibration apparatus 200 vibrates based on a vibration signal of the resonance frequency band (or the natural frequency band), the display member 100 can have a largest displacement width (or a vibration width or a driving width). To increase a restoration (or recovery) characteristic against a dent occurring in the display member 100 and reduce a restoration (or recovery) time, the vibration signal can include a frequency band of the resonance frequency band (or the natural frequency band) of the vibration apparatus 200 in the vibration mode. For example, in the vibration mode, the vibration signal can include a frequency (or a single frequency) corresponding to a resonance frequency (or a natural frequency) of the vibration apparatus 200.

According to an embodiment of the present disclosure, the vibration mode can include a first vibration mode and a second vibration mode. The first vibration mode can be executed in response to a selection by a user. For example, the first vibration mode can be an aperiodic vibration mode or a non-silent vibration mode. The second vibration mode can be executed during a predetermined period. For example, the second vibration mode can be a periodic vibration mode, a silent vibration mode, or a night vibration mode. Also, the second vibration mode can be executed upon powering on the device or carried out when powering off the device, or on demand in response to a user request.

According to an embodiment of the present disclosure, the vibration signal based on the vibration mode can include a first vibration signal based on the first vibration mode and a second vibration signal based on the second vibration mode. The vibration signal can include the first vibration signal and the second vibration signal which differs from the first vibration signal. The first vibration signal can have a voltage level which differs from the second vibration signal. A frequency of the first vibration signal can be the same as the second vibration signal, and a voltage level of the first vibration signal can be different from the second vibration signal. The first vibration signal and the second vibration signal can have a same frequency, and a voltage level of the first vibration signal can be higher than the second vibration signal. For example, the first vibration signal can have a predetermined voltage level so that the user recognizes or does not recognize a vibration of the vibration apparatus 200. For example, the second vibration signal can have a predetermined voltage level so that the user does not recognize a vibration of the vibration apparatus 200. For example, a voltage level of the second vibration signal can be half of a voltage level of the first vibration signal, but embodiments of the present disclosure are not limited thereto.

According to an embodiment of the present disclosure, a period (or time) of the first vibration mode and a period (or time) of the second vibration mode can be equal to or different from each other, based on a default setting of the apparatus 10 or a setting of the user. For example, a period (or time) of the first vibration mode can be shorter than the second vibration mode. For example, a period (or time) of the first vibration mode can be half of a period (or time) of the second vibration mode, but embodiments of the present disclosure are not limited thereto.

According to an embodiment of the present disclosure, a predetermined period for the second vibration mode can be a default setting time which is set in the apparatus 10 or a time (or period) which is set by the user. For example, the predetermined period for the second vibration mode can be set to a portion of a time for which the user does not use the apparatus 10. For example, the predetermined period for the second vibration mode can be set to a time during the night for which the user does not use the apparatus 10. For example, the predetermined period for the second vibration mode can be set to a portion of a sleeping time of the user Thus, the second vibration mode can be automatically carried out during a time that does not interfere with the user's use of the device or apparatus.

According to an embodiment of the present disclosure, the second vibration mode can be executed when the apparatus 10 is being charged or the apparatus 10 is not driven (or used), so that the user does not recognize a vibration of the apparatus 10 or sleeping of the user is not disturbed, in a predetermined period.

Referring to FIGS. 1 to 3, the vibration apparatus 200 can be connected or coupled to the rear surface of the display member 100 to overlap one or more of the first display area A1 and the second display area A2 of the display member 100. For example, the vibration apparatus 200 can be connected or coupled to the rear surface of the display member 100 to overlap one or more of the first display area A1 and the second display area A2, except the third display area A3, of the display member 100.

The vibration apparatus 200 according to an embodiment of the present disclosure can include a piezoelectric device 210.

The piezoelectric device 210 can be connected or coupled to the rear surface of the display member 100 to overlap with the first display area A1 of the display member 100. The piezoelectric device 210 can include a piezoelectric material. The piezoelectric device 210 can include a piezoelectric ceramic material.

A center portion of the piezoelectric device 210 can be disposed at a center portion of the first display area A1, but embodiments of the present disclosure are not limited thereto. For example, the center portion of the piezoelectric device 210 can be spaced apart from the center portion of the first display area A1. For example, a size of the piezoelectric device 210 can be greater than half of a size of the first display area A1 and can be smaller than a total size of the first display area A1, but embodiments of the present disclosure are not limited thereto.

The piezoelectric device 210 can vibrate the first display area A1 of the display member 100 to output a sound S, based on a vibration of the display member 100. For example, the first display area A1 of the display member 100 can be used as a vibration plate or a sound output plate, which outputs the sound S based on a vibration of the piezoelectric device 210. For example, the rear member 170 of the display member 100 can be used as a vibration plate or a sound output plate, which outputs the sound S based on a vibration of the piezoelectric device 210. A vibration of the piezoelectric device 210 configured to overlap the first display area A1 of the display member 100 can be transferred to all of the display member 100 through the rear member 170.

The piezoelectric device 210 can vibrate by a driving signal based on the driving mode to vibrate the display member 100, and thus, the piezoelectric device 210 can provide a user with one or more of the sound S and a haptic feedback.

The piezoelectric device 210 can vibrate by the vibration signal based on the vibration mode to vibrate the display member 100, and thus, the piezoelectric device 210 can restore (or recover) a dent which occurs in the display member 100 due to a press such as a finger touch or a pen touch or the like of the user. For example, a vibration of the piezoelectric device 210 can vibrate the first display area A1 of the display member 100 to restore (or recover) the dent which occurs in the first display area A1. In other words, the piezoelectric device 210 can vibrate the display member 100 to help shake lose any dents and restore flatness. A vibration of the piezoelectric device 210 can vibrate the second display area A2 and the third display area A3 of the display panel 110 through the rear member 170, and thus, can restore (or recover) a dent occurring in the second display area A2 and can restore (or recover) creases occurring in the third display area A3.

The apparatus 10 according to an embodiment of the present disclosure can further include a supporting frame 300 and a connection member 400.

The supporting frame 300 can be disposed at the rear surface of the display member 100 and can cover the vibration apparatus 200. The support frame 300 can additionally support the display member 100.

The supporting frame 300 can include a metal material. For example, the supporting frame 300 can include a metal material, such as stainless steel (SUS), stainless steel (SUS) including other metals such as nickel (Ni), iron (Fe), aluminum (A1)-based, or magnesium (Mg), but embodiments of the present disclosure are not limited thereto. The supporting frame 300 can dissipate heat, occurring based on driving of the display member 100, and/or heat occurring based on driving of the vibration apparatus 200. For example, the supporting frame 300 can be a middle frame or a middle plate, or the like, but embodiments of the present disclosure are not limited thereto.

The connection member 400 can be disposed or connected between the rear surface of the display member 100 (or the rear member 170) and the supporting frame 300. For example, the connection member 400 can be configured to connect or couple the supporting frame 300 to the rear surface of the display member 100 based on a partial attachment scheme instead of an entire surface attachment scheme. The connection member 400 can be connected between the supporting frame 300 and the rear surface of the display member 100 to be spaced apart from the vibration apparatus 200 and can be configured to surround around the vibration apparatus 200. For example, the connection member 400 can be connected between the supporting frame 300 and the rear member 170 of the display member 100 to be spaced apart from the vibration apparatus 200 and can be configured to surround around the vibration apparatus 200.

The connection member 400 can be implemented in a pattern shape between the rear surface of the display member 100 and the supporting frame 300. For example, the connection member 400 can be implemented in a tetragonal band shape or a circular band shape to overlap with each of the first and second display areas A1 and A2 of the display panel 110. For example, the connection member 400 can be implemented to overlap with a periphery portion of each of the first and second display areas A1 and A2 of the display panel 110. The connection member 400 can provide a gap space GS between the rear surface of the display member 100 and the supporting frame 300. For example, the connection member 400 can provide a closed gap space (or a closed sound space) GS between the rear surface of the display member 100 and the supporting frame 300. The connection member 400 can be separated at a region overlapping the third display area A3 of the display panel 110. For example, the connection member 400 can be configured to overlap with each of the first display area A1 and the second display area A2, other than the third display area A3, of the display panel 110.

The connection member 400 can be implemented in a pattern shape between the rear surface of the display member 100 and the supporting frame 300. The connection member 400 can be partially disposed between the supporting frame 300 and the rear surface of the display member 100 based on the partial attachment scheme instead of the entire surface attachment scheme, and thus, can include a plurality of adhesive patterns or a hollow portion. Accordingly, the vibration apparatus 200 can be connected to the rear surface of the display member 100 between adhesive patterns of the connection member 400, or can be connected to the rear surface of the display member 100 at the hollow portion of the connection member 400.

The connection member 400 according to an embodiment of the present disclosure can include a pressure sensitive adhesive (PSA), an optically cleared adhesive (OCA), an optically cleared resin (OCR), epoxy resin, acrylic resin, silicone resin, urethane resin, a double-sided tape, a double-sided foam tape, or a double-sided foam pad, but embodiments of the present disclosure are not limited thereto.

The apparatus 10 according to an embodiment of the present disclosure can further include a set frame 500 and a back cover 600.

The set frame 500 can be disposed at a rear surface of the supporting frame 300 or under the supporting frame 300. The set frame 500 can include a driving circuit part 510 for driving of the apparatus 10 and an accommodation space 520 which accommodates a peripheral circuit, such as a battery and various circuit elements.

The driving circuit part 510 can be configured to drive the vibration apparatus 200 in the driving mode or the vibration mode.

According to an embodiment of the present disclosure, the driving circuit part 510 can drive the vibration apparatus 200 in the driving mode, based on one or more of an input of a sound source signal and a user touch. For example, the driving circuit part 510 based on the driving mode can generate a driving signal including one or more of the sound signal and a haptic feedback signal, based on one or more of the sound source signal and the user touch, and can supply the generated driving signal to the vibration apparatus 200.

According to another embodiment of the present disclosure, the driving circuit part 510 can respond to a selection by the user, or can drive the vibration apparatus 200 in the vibration mode during a predetermined period. For example, the driving circuit part 510 based on the vibration mode can generate a vibration signal having a predetermined frequency and can supply the generated vibration signal to the vibration apparatus 200. For example, in the driving mode, the driving circuit part 510 can supply the vibration apparatus 200 with a vibration signal including a frequency of a frequency band of a predetermined resonance frequency band (or natural frequency band) of the vibration apparatus 200, to restore (or recover) a dent occurring in the display member 100. For example, in the vibration mode, the driving circuit part 510 can supply the vibration apparatus 200 with a vibration signal having a frequency (or a single frequency) corresponding to a resonance frequency (or natural frequency) of the vibration apparatus 200.

In response to a selection by the user, the driving circuit part 510 can drive the vibration apparatus 200 in the first vibration mode of the vibration mode and can drive the vibration apparatus 200 in the second vibration mode of the vibration mode during a predetermined period. For example, in response to a selection by the user, the driving circuit part 510 can generate a first vibration signal based on the first vibration mode to supply the first vibration signal to the vibration apparatus 200 and can generate a second vibration signal based on the second vibration mode to supply the second vibration signal to the vibration apparatus 200 during a predetermined period (e.g., according to a set schedule which can be selected by the user).

The driving circuit part 510 can drive the vibration apparatus 200 in the second vibration mode, based on a default setting time set in the apparatus 10 or a time (or a period) set by the user. For example, in the default setting time set in the apparatus 10 or the time (or the period) set by the user, the driving circuit part 510 can determine whether a charging circuit is driven and can thus determine whether the apparatus is being charged or whether the apparatus 10 is driven (or used), based on a user touch, and when the apparatus 10 is not driven (or used), the driving circuit part 510 can drive the vibration apparatus 200 in the second vibration mode. For example, according to an embodiment, the second vibration mode can be automatically activated after a predetermined amount of time elapsed from a last receiving user touch input (e.g., 20 minutes or 1 hour, etc.). Also, the predetermined amount of time can be set by the user.

According to another embodiment of the present disclosure, the driving circuit part 510 can supply the vibration apparatus 200 with the first vibration signal based on the first vibration mode of the vibration mode and can supply the vibration apparatus 200 with the second vibration signal based on the second vibration mode of the vibration mode. Therefore, the vibration apparatus 200 can relatively strongly vibrate during a short period to vibrate the display member 100 in the first vibration mode, according to the first vibration signal based on the first vibration mode, and thus, can restore (or recover) a dent occurring in the display member 100. The vibration apparatus 200 can relatively weakly vibrate during a long period to vibrate the display member 100 in the second vibration mode, according to the second vibration signal based on the second vibration mode, and thus, can restore (or recover) a dent occurring in the display member 100.

The back cover 600 can be disposed at a rear surface of the set frame 500 or under the set frame 500. The back cover 600 can be a rearmost surface of the apparatus 10. The back cover 600 can include a metal material, a plastic material, or a glass material, but embodiments of the present disclosure are not limited thereto.

The apparatus 10 according to an embodiment of the present disclosure can output a sound S, generated based on a vibration of the display member 100 based on a vibration based on the driving mode of the vibration apparatus 200 at the rear surface of the display member 100, in a forward direction FD of the display member 100, and because the vibration apparatus 200 is surrounded by a connection member 400, the reliability of the vibration apparatus 200 including a piezoelectric material (or a piezoelectric device) can be enhanced. In addition, in the apparatus 10 according to an embodiment of the present disclosure, a dent occurring in the display member 100 can be restored (or recovered) by a vibration of the display member 100 based on a vibration based on the vibration mode of the vibration apparatus 200.

Figure 6:
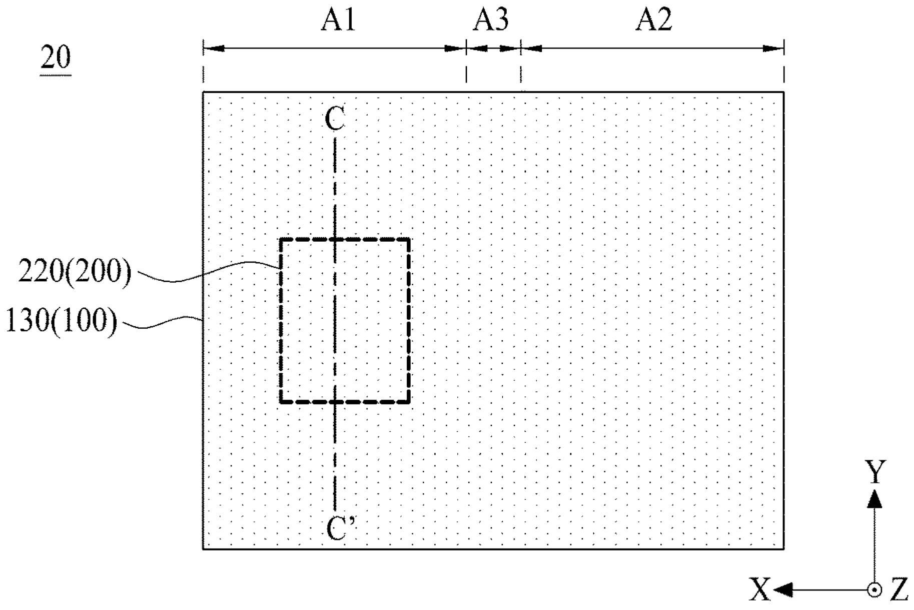
FIG. 6 illustrates an apparatus according to another embodiment of the present disclosure.
Figure 7:
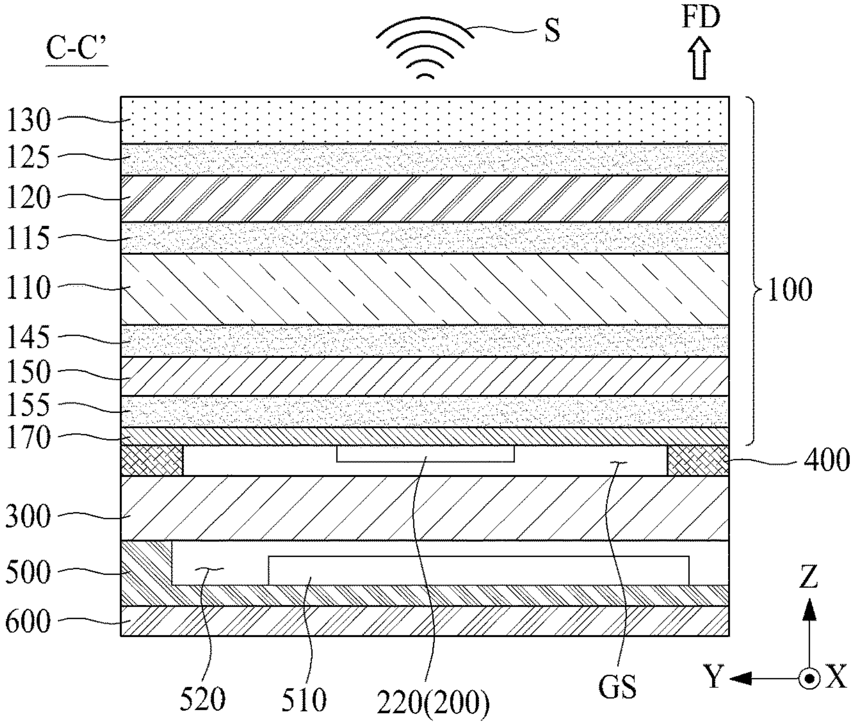
FIG. 7 is a cross-sectional view taken along line C-C' of FIG. 6 according to an embodiment of the present disclosure.

FIG. 6 illustrates an apparatus according to another embodiment of the present disclosure. FIG. 7 is a cross-sectional view taken along line C-C' of FIG. 6. FIGS. 6 and 7 illustrate an embodiment implemented by modifying a size of the vibration apparatus 200 in the apparatus 10 described above with reference to FIGS. 1 to 4. Hereinafter, in describing an apparatus 20 according to another embodiment of the present disclosure, elements which differ from the elements of the apparatus 10 according to an embodiment of the present disclosure will be described.

Referring to FIGS. 6 and 7, in the apparatus 20 according to another embodiment of the present disclosure, except for that a vibration apparatus 200 is configured to have a size which is smaller than the vibration apparatus 200 of the apparatus 10 described above with reference to FIGS. 1 to 4, the vibration apparatus 200 can be the same as or substantially the same as the vibration apparatus 200 described above with reference to FIGS. 1 to 4, and thus, the description of the vibration apparatus 200 described above with reference to FIGS. 1 to 4 except a size of the vibration apparatus 200 can be included in a description of the vibration apparatus 200 illustrated in FIGS. 6 and 7.

A center portion of the vibration apparatus 200 can be disposed at a center portion of the first display area A1, but embodiments of the present disclosure are not limited thereto. For example, the center portion of the vibration apparatus 200 can be spaced apart from the center portion of the first display area A1. For example, a size of the vibration apparatus 200 can be smaller than half of a size of the first display area A1, but embodiments of the present disclosure are not limited thereto. Also, according to an embodiment, a plurality of vibration apparatuses 200 can be provided to overlap with the first display area A1. The size of the vibration apparatus 200 can have half of the size of the vibration apparatus 200 described above with reference to FIGS. 1 to 4 or smaller than half the size, but embodiments of the present disclosure are not limited thereto.

The vibration apparatus 200 according to an embodiment of the present disclosure can include a piezoelectric device 220.

The piezoelectric device 220 can be connected or coupled to the rear surface of the display member 100 to overlap the first display area A1 of the display member 100. The piezoelectric device 220 can include a piezoelectric material. The piezoelectric device 220 can include a piezoelectric ceramic material.

A center portion of the piezoelectric device 220 can be disposed at a center portion of the first display area A1, but embodiments of the present disclosure are not limited thereto. For example, the center portion of the piezoelectric device 220 can be spaced apart from the center portion of the first display area A1. For example, a size of the piezoelectric device 220 can be smaller than half of a size of the first display area A1, but embodiments of the present disclosure are not limited thereto. For example, the size of the piezoelectric device 220 can have half of the size of the piezoelectric device 210 described above with reference to FIGS. 1 to 4, but embodiments of the present disclosure are not limited thereto.

The piezoelectric device 220 can vibrate by a driving signal based on the driving mode to vibrate the display member 100, and thus, the piezoelectric device 220 can provide a user with one or more of the sound S and a haptic feedback. The piezoelectric device 220 can vibrate according to a vibration signal based on a vibration mode to vibrate a display member 100, and thus, can restore (or recover) a dent which occurs in the display member 100 due to a press such as a finger touch or a pen touch of a user.

The apparatus 20 according to another embodiment of the present disclosure can have a same effect as the apparatus 10 according to an embodiment of the present disclosure described above with reference to FIGS. 1 to 4, and thus, repeated descriptions thereof are omitted.

Figure 8:
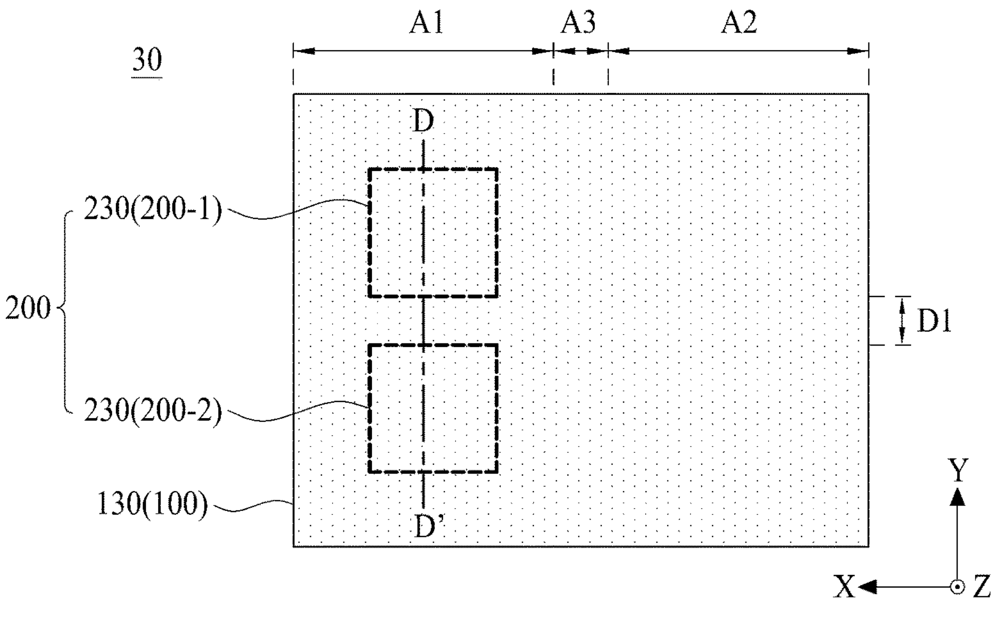
FIG. 8 illustrates an apparatus according to another embodiment of the present disclosure.
Figure 9:
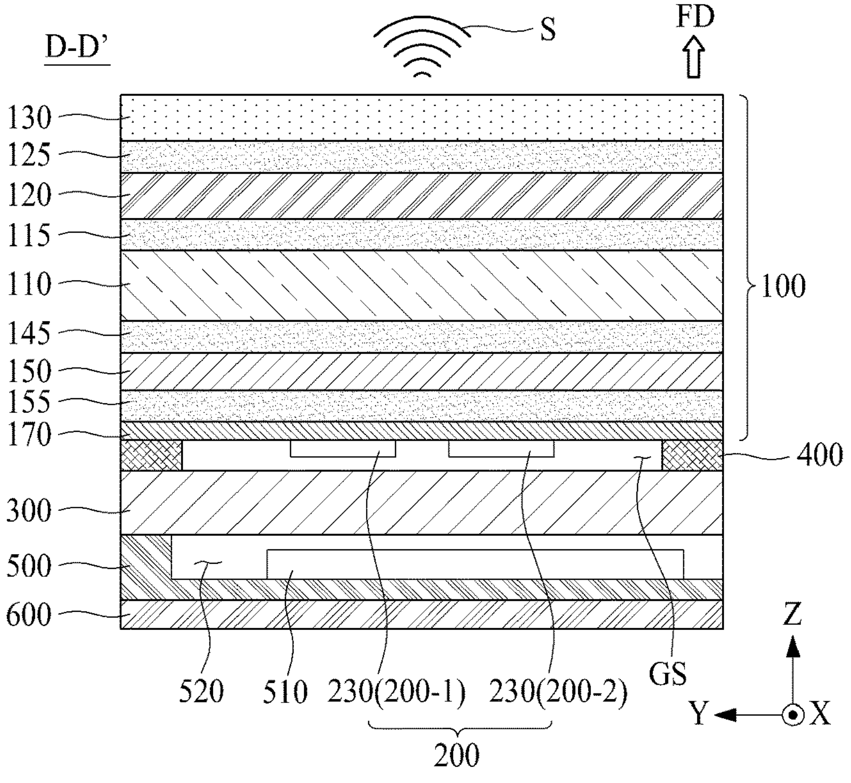
FIG. 9 is a cross-sectional view taken along line D-D' of FIG. 8 according to an embodiment of the present disclosure.

FIG. 8 illustrates an apparatus according to another embodiment of the present disclosure. FIG. 9 is a cross-sectional view taken along line D-D' of FIG. 8. FIGS. 8 and 9 illustrate an embodiment implemented by modifying the size and number of vibration apparatuses 200 in the apparatus 10 described above with reference to FIGS. 1 to 4. Hereinafter, in describing an apparatus 30 according to another embodiment of the present disclosure, elements which differ from the elements of the apparatus 10 according to an embodiment of the present disclosure will be described.

Referring to FIGS. 8 and 9, in the apparatus 30 according to another embodiment of the present disclosure, a vibration apparatus 200 can include a plurality of vibration apparatuses 200-1 and 200-2. For example, the vibration apparatus 200 can include first and second vibration apparatuses 200-1 and 200-2.

The first and second vibration apparatuses 200-1 and 200-2 can be disposed at a rear surface of a display member 100 to overlap a first display area A1 of the display member 100. For example, the first and second vibration apparatuses 200-1 and 200-2 can be disposed at or connected to a rear surface of a rear member 170 to overlap a first display area A1.

The first and second vibration apparatuses 200-1 and 200-2 can be disposed in parallel with each other along a second direction Y within a gap space GS. For example, the first and second vibration apparatuses 200-1 and 200-2 can be disposed in parallel with each other along the second direction Y to have a first interval D1 within a gap space GS. Also, according to an embodiment, a plurality of vibration apparatuses can be arranged according to a regular pattern (e.g., a grid pattern, a circle pattern, a star pattern, a triangle pattern, etc.) or can be irregularly arranged and can have different or mixed sizes.

A center portion of each of the first and second vibration apparatuses 200-1 and 200-2 can be disposed closer to a center portion of the first display area A1 than a lateral surface (or a sidewall) of the display member 100, but embodiments of the present disclosure are not limited thereto. For example, the center portion of each of the first and second vibration apparatuses 200-1 and 200-2 can be disposed closer to the lateral surface (or the sidewall) of the display member 100 than the center portion of the first display area A1, but embodiments of the present disclosure are not limited thereto.

A size of each of the first and second vibration apparatuses 200-1 and 200-2 can have a size less half of a size of the vibration apparatuses 200 described above with reference to FIGS. 1 to 4. For example, the size of each of the first and second vibration apparatuses 200-1 and 200-2 can have a size which is smaller than half of a size of the vibration apparatuses 200 described above with reference to FIGS. 6 and 7. For example, each of the first and second vibration apparatuses 200-1 and 200-2 can have a square shape which has a same width and length as a width parallel to a first direction X in the vibration apparatuses 200 described above with reference to FIGS. 6 and 7, but embodiments of the present disclosure are not limited thereto (e.g., the first and second vibration apparatuses 200-1 and 200-2 can have other shapes, such as a circle shape, a triangle shape, an oval shape, etc.). For example, each of the first and second vibration apparatuses 200-1 and 200-2 can have a same width as the vibration apparatuses 200 described above with reference to FIGS. 6 and 7 and half of a length thereof.

Each of the first and second vibration apparatuses 200-1 and 200-2 can include a piezoelectric device 230.

The piezoelectric device 230 can be connected or coupled to the rear surface of the display member 100 to overlap with the first display area A1 of the display member 100. The piezoelectric device 230 can include a piezoelectric material. The piezoelectric device 230 can include a piezoelectric ceramic material.

The piezoelectric device 230 can vibrate by a driving signal based on the driving mode to vibrate the display member 100, and thus, the piezoelectric device 230 can provide a user with one or more of the sound S and a haptic feedback. The piezoelectric device 230 can vibrate according to a vibration signal based on a vibration mode to vibrate a display member 100, and thus, can restore (or recover) a dent which occurs in the display member 100 due to a press such as a finger touch or a pen touch of a user.

The apparatus 30 according to another embodiment of the present disclosure can have a same effect as the apparatus 10 according to an embodiment of the present disclosure described above with reference to FIGS. 1 to 4, and thus, repeated descriptions thereof are omitted.

Figure 10:
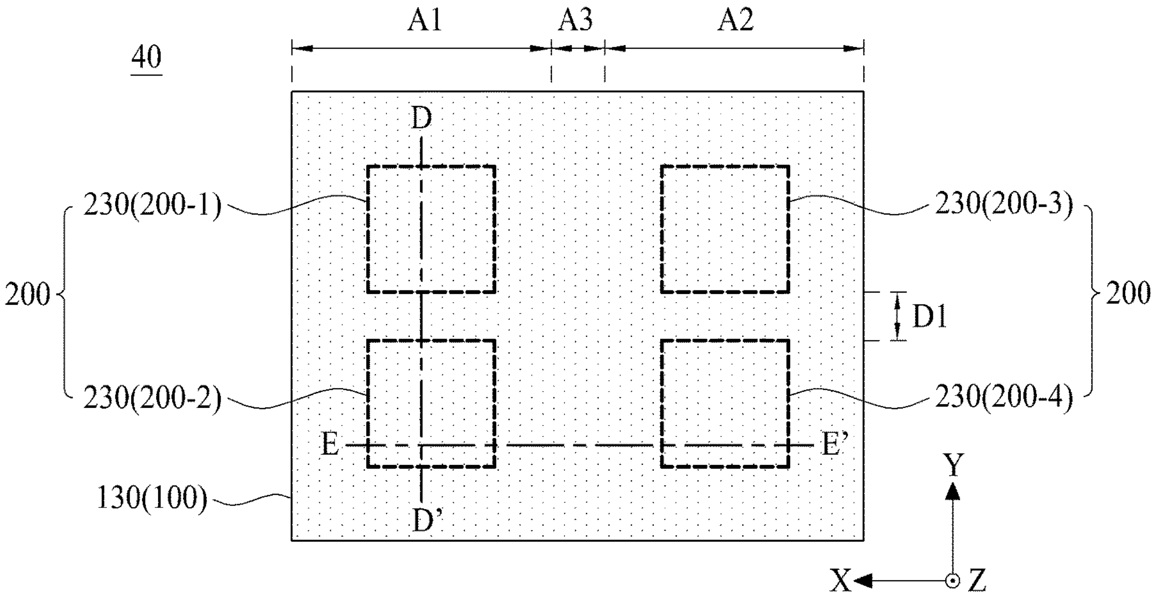
FIG. 10 illustrates an apparatus according to another embodiment of the present disclosure.
Figure 11:
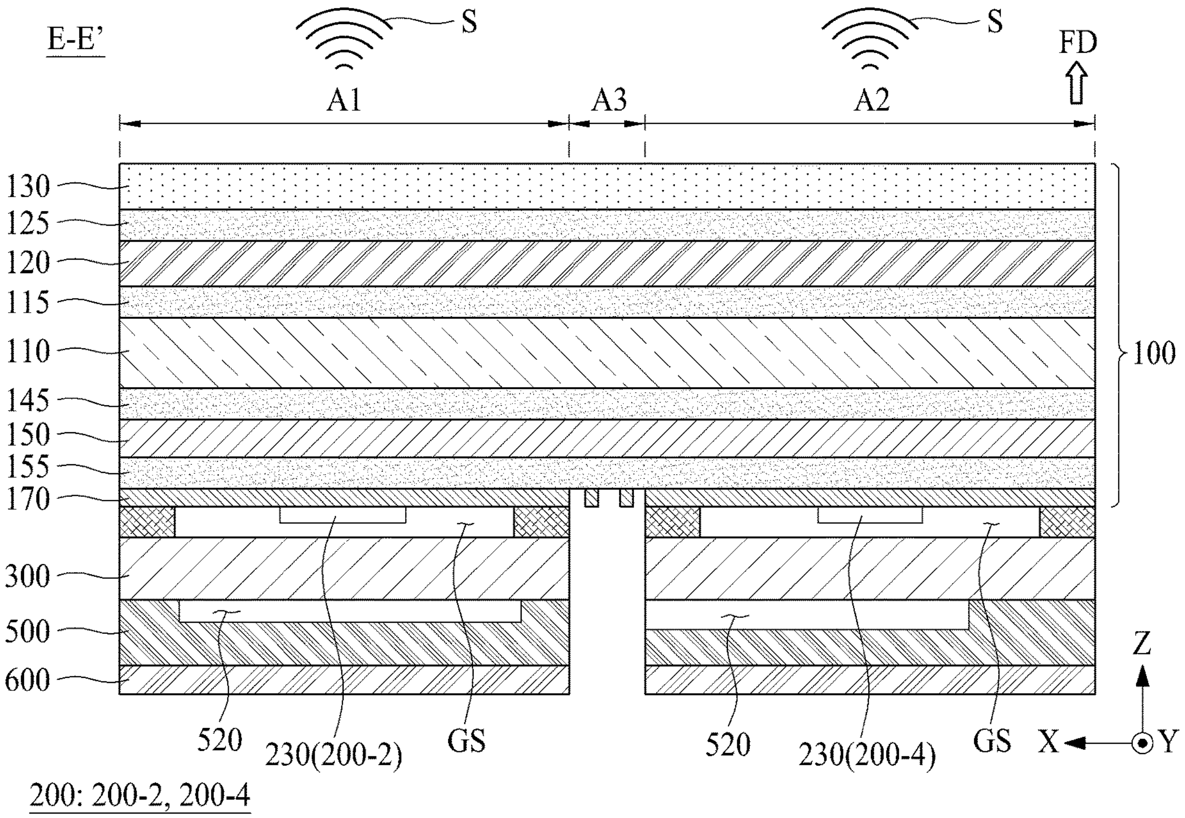
FIG. 11 is a cross-sectional view taken along line E-E' of FIG. 10 according to an embodiment of the present disclosure.

FIG. 10 illustrates an apparatus according to another embodiment of the present disclosure. FIG. 11 is a cross-sectional view taken along line E-E' of FIG. 10. FIGS. 10 and 11 illustrate an embodiment where a vibration apparatus 200 is additionally provided at a second display area A2 of the apparatus 20 described above with reference to FIGS. 8 and 9. Hereinafter, in describing an apparatus 40 according to another embodiment of the present disclosure, elements which differ from the elements of the apparatus 30 according to an embodiment of the present disclosure will be described. A cross-sectional view taken along line D-D' illustrated in FIG. 10 is illustrated in FIG. 9.

Referring to FIGS. 9 to 11, in the apparatus 40 according to another embodiment of the present disclosure, a vibration apparatus 200 can include a plurality of vibration apparatuses 200-1, 200-2, 200-3, and 200-4. For example, the vibration apparatus 200 can include first to fourth vibration apparatuses 200-1 to 200-4.

The first and second vibration apparatuses 200-1 and 200-2 can be the same as or substantially the same as the first and second vibration apparatuses 200-1 and 200-2 described above with reference to FIGS. 8 and 9, and thus, repeated descriptions thereof are omitted.

The third and fourth vibration apparatuses 200-3 and 200-4 can be disposed at a rear surface of a display member 100 to overlap a second display area A2 of the display member 100. For example, the third and fourth vibration apparatuses 200-3 and 200-4 can be disposed at or connected to the rear surface of a display member 100 to overlap with a second display area A2 of the display member 100.

The third and fourth vibration apparatuses 200-3 and 200-4 can be disposed in parallel with each other along in a second direction Y within a gap space GS. For example, the third and fourth vibration apparatuses 200-3 and 200-4 can be disposed in parallel with each other along the second direction Y to have a first interval D1 within a gap space GS.

Each of the third and fourth vibration apparatuses 200-3 and 200-4 can be disposed to be symmetrical with each of the first and second vibration apparatuses 200-1 and 200-2 with respect to the second display area A2 of the display member 100. Also, according to another embodiment, the vibration apparatuses can be symmetrically arranged or have an irregular spacing or with different densities. For example, according to an embodiment, more vibration apparatuses per unit area can be disposed a center area of the display area, and fewer vibration apparatuses per unit area can be disposed in an outer area or along the perimeter of the display area.

A size of each of the third and fourth vibration apparatuses 200-3 and 200-4 can be equal to each of the first and second vibration apparatuses 200-1 and 200-2, but embodiments of the present disclosure are not limited thereto. For example, the size of each of the third and fourth vibration apparatuses 200-3 and 200-4 can be greater or smaller than each of the first and second vibration apparatuses 200-1 and 200-2.

Each of a plurality of vibration apparatuses 200-1 to 200-4 or the first to fourth vibration apparatuses 200-1 to 200-4 can include a piezoelectric device 230.

The piezoelectric device 230 of each of the first and second vibration apparatuses 200-1 and 200-2 can be connected or coupled to the rear surface of the display member 100 to overlap a first display area A1 of the display member 100. The piezoelectric device 230 of each of the third and fourth vibration apparatuses 200-3 and 200-4 can be connected or coupled to the rear surface of the display member 100 to overlap the second display area A2 of the display member 100.

The piezoelectric device 230 can include a piezoelectric material. The piezoelectric device 230 can include a piezoelectric ceramic material.

The piezoelectric device 230 can vibrate by a driving signal based on the driving mode to vibrate the display member 100, and thus, the piezoelectric device 230 can provide a user with one or more of the sound S and a haptic feedback. The piezoelectric device 230 can vibrate according to a vibration signal based on a vibration mode to vibrate a display member 100, and thus, can restore (or recover) a dent which occurs in the display member 100 due to a press such as a finger touch or a pen touch of a user.

The apparatus 40 according to another embodiment of the present disclosure can have a same effect as the apparatus 10 according to an embodiment of the present disclosure described above with reference to FIGS. 1 to 4, and thus, repeated descriptions thereof are omitted.

Moreover, an apparatus 40 according to another embodiment of the present disclosure can output a first sound (or a left sound) in a forward direction FD of the display member 100, based on a vibration of the first display area A1 based on a vibration based on a driving mode of the first and second vibration apparatuses 200-1 and 200-2, and can output a second sound (or a right sound) in the forward direction FD of the display member 100, based on a vibration of the second display area A2 based on a vibration based on a driving mode of the third and fourth vibration apparatuses 200-3 and 200-4. Accordingly, the apparatus 40 according to another embodiment of the present disclosure can provide a stereophonic sound or surround sound to a user, based on the first and second sounds.

Moreover, in the apparatus 40 according to another embodiment of the present disclosure, a dent occurring in the first display area A1 can be restored (or recovered) based on a vibration of the first display area A1 based on a vibration based on a vibration mode of the first and second vibration apparatuses 200-1 and 200-2, and a dent occurring in the second display area A2 can be restored (or recovered) based on a vibration of the second display area A2 based on a vibration based on a vibration mode of the third and fourth vibration apparatuses 200-3 and 200-4. In addition, in the apparatus 40 according to another embodiment of the present disclosure, the restoration (or recovery) of creases occurring in the third display area A3 can be restored (or recovered) based on a vibration of the third display area A3 based on a vibration based on a vibration mode of the first to fourth vibration apparatuses 200-1 to 200-4.

According to another embodiment of the present disclosure, the configuration of the vibration apparatus 40 described above with reference to FIGS. 9 to 11 can be identically applied to the vibration apparatuses 10 and 20 described above with reference to FIGS. 1 to 4, 6, and 8. For example, each of the vibration apparatuses 10 and 20 described above with reference to FIGS. 1 to 4, 6, and 8 can further include another vibration apparatus (or another piezoelectric device) which is connected or coupled to the rear surface of the display member 100 to overlap with the second display area A2 of the display member 100. For example, the other vibration apparatus (or the other piezoelectric device) additionally provided in the second display area A2 can have a size which is equal to or different from the vibration apparatus 200 (or the other piezoelectric device 210) in the first display area A1.

Figure 12:
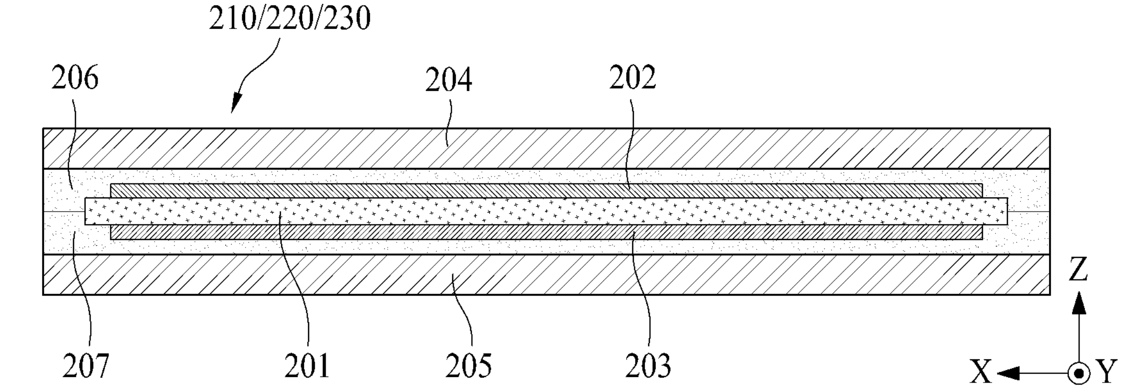
FIG. 12 illustrates a piezoelectric device of a vibration apparatus according to an embodiment of the present disclosure.
Figure 13:
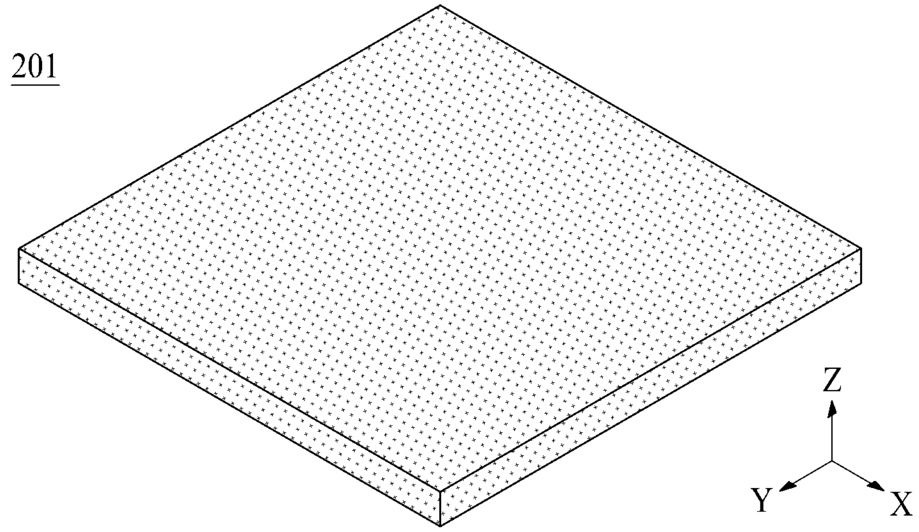
FIG. 13 illustrates a vibration part illustrated in FIG. 12 according to an embodiment of the present disclosure.

FIG. 12 illustrates a piezoelectric device of a vibration apparatus according to an embodiment of the present disclosure. FIG. 13 illustrates a vibration part illustrated in FIG. 12. FIGS. 12 and 13 illustrate each of the piezoelectric device 210, 220, and 230 illustrated in FIGS. 1 to 3, and 6 to 11.

Referring to FIGS. 12 and 13, the piezoelectric device 210, 220, and 230 of the vibration apparatus (or the first to fourth vibration apparatuses) 200 according to an embodiment of the present disclosure can include a vibration part 201, a first electrode part 202, and a second electrode part 203.

The vibration part 201 according to an embodiment of the present disclosure can include a piezoelectric material. For example, the vibration part 201 can include at least one or more of a piezoelectric inorganic material and a piezoelectric organic material.

The vibration part 201 can include a piezoelectric material or an electro active material having a piezoelectric effect. For example, the piezoelectric material can have a characteristic where pressure or twisting is applied to a crystalline structure by an external force, a potential difference occurs due to dielectric polarization caused by a relative position change of a positive (+) ion and a negative (−) ion, and a vibration is generated by an electric field based on a voltage applied thereto. The vibration part 201 can be referred to as the terms such as a vibration layer, a piezoelectric layer, a piezoelectric material layer, an electro active layer, a piezoelectric material portion, an electro active portion, a piezoelectric structure, or a piezoelectric composite layer, or the like, but embodiments of the present disclosure are not limited thereto.

The piezoelectric device 210, 220, and 230 or the vibration part 201 can be configured as a ceramic-based material have a capable of implementing a relatively strong vibration, or can be configured as a piezoelectric ceramic having a perovskite-based crystalline structure. The perovskite crystalline structure can have a piezoelectric effect and/or an inverse piezoelectric effect, and can be a plate-shaped structure having orientation.

The piezoelectric ceramic can be configured as a single crystalline ceramic having a crystalline structure, or can be configured as a ceramic material having a polycrystalline structure or polycrystalline ceramic. A piezoelectric material including the single crystalline ceramic can include $\alpha$-$AlPO_4$, $\alpha$-$SiO_2$, $LiNbO_3$, $Tb_2(MoO_4)_3$, $Li_2B_4O_7$, or ZnO, but embodiments of the present disclosure are not limited thereto. A piezoelectric material including the polycrystalline ceramic can include a lead zirconate titanate (PZT)-based material, including lead (Pb), zirconium (Zr), and titanium (Ti), or can include a lead zirconate nickel niobate (PZNN)-based material, including lead (Pb), zirconium (Zr), nickel (Ni), and niobium (Nb), but embodiments of the present disclosure are not limited thereto. For example, the vibration part 201 can include at least one or more of calcium titanate ($CaTiO_3$), barium titanate ($BaTiO_3$), and strontium titanate ($SrTiO_3$), without lead (Pb), but embodiments of the present disclosure are not limited thereto.

The first electrode part 202 can be disposed at a first surface (or an upper surface) of the vibration part 201 and can be electrically connected to the first surface of the vibration part. The second electrode part 202 can be disposed at a surface which differs from the first surface of the vibration part 201. For example, the second electrode part 203 can be disposed at a second surface (or a lower surface) of the vibration part 201 and can be electrically connected to the second surface of the vibration part 201. For example, the vibration part 201 can be polarized (or poling) by a certain voltage applied to the first electrode part 202 and the second electrode part 203 in a certain temperature atmosphere or a temperature atmosphere which is changed from a high temperature to a room temperature, but embodiments of the present disclosure are not limited thereto.

The first electrode part 202 can have a single electrode shape where the first electrode part 210*b* is disposed at an entire first surface of the vibration part 201. The first electrode part 202 can include a transparent conductive material, a semitransparent conductive material, or an opaque conductive material.

The second electrode part 203 can be disposed at the second surface (or a rear surface or backside surface), which is opposite to or different from the first surface, of the vibration part 201 and can be electrically connected to the second surface of the vibration part 201. For example, the second electrode part 203 can have a single electrode shape. The second electrode part 203 can include a transparent conductive material, a semitransparent conductive material, or an opaque conductive material.

The vibration apparatus 200 according to an embodiment of the present disclosure can further include a first cover member 204 and a second cover member 205.

The first cover member 204 can be disposed at a first surface of the vibration part 201. For example, the first cover member 204 can be on the first electrode part 202. For example, the first cover member 204 can cover the first electrode part 202 disposed at the first surface of the vibration part 201, and thus, the first cover member 204 can protect the first surface of the vibration part 201 or the first electrode part 202.

The second cover member 205 can be disposed at a second surface of the vibration part 201. For example, the second cover member 205 can be under the second electrode part 203. For example, the second cover member 205 can cover the second electrode part 203 disposed at the second surface of the vibration part 201, and thus, the second cover member 205 can protect the second surface of the vibration part 201 or the second electrode part 203.

Each of the first cover member 204 and the second cover member 205 according to an embodiment of the present disclosure can include one or more materials of plastic, fiber, carbon, and wood, but embodiments of the present disclosure are not limited thereto. For example, each of the first cover member 204 and the second cover member 205 can include a same material or different materials.

The piezoelectric device 210, 220, and 230 according to an embodiment of the present disclosure can further include a first adhesive layer 206 and a second adhesive layer 207. For example, the first adhesive layer 206 can be disposed between the first cover member 204 and the first electrode part 202. For example, the second adhesive layer 207 can be disposed between the second cover member 205 and the second electrode part 203. The first adhesive layer 206 and the second adhesive layer 207 can include a same material or different materials.

The first cover member 204 can be connected or coupled to the first electrode part 202 by a first adhesive layer 206. For example, the first cover member 204 can be disposed at the first surface of the vibration part 201 by a film laminating process using the first adhesive layer 206. Accordingly, the vibration part 201 can be integrated (or disposed) into the first cover member 204.

The second cover member 205 can be connected or coupled to the second electrode part 203 by a second adhesive layer 207. For example, the second cover member 205 can be disposed at the second surface of the vibration part 201 by a film laminating process using the second adhesive layer 207. Accordingly, the vibration part 201 can be integrated (or disposed) into the second cover member 205.

According to an embodiment of the present disclosure, the first adhesive layer 206 and the second adhesive layer 207 can completely surround the vibration part 201. For example, the first adhesive layer 206 and the second adhesive layer 207 can be disposed between the first cover member 204 and the second cover member 205 to surround the vibration part 201, the first electrode part 202, and the second electrode part 203. For example, the first adhesive layer 206 and the second adhesive layer 207 can be disposed between the first cover member 204 and the second cover member 205 to completely surround the vibration part 201, the first electrode part 202, and the second electrode part 203. For example, the vibration part 201, the first electrode part 202, and the second electrode part 203 can be buried or embedded between the first adhesive layer 206 and the second adhesive layer 207. In other words, the vibration part 201 can be sealed between the first adhesive layer 206 and the second adhesive layer 207. For convenience of description, the first adhesive layer 206 and the second adhesive layer 207 are illustrated, or are not limited thereto and can be one adhesive layer.

Each of the first adhesive layer 206 and the second adhesive layer 207 according to an embodiment of the present disclosure can include an electrical insulation material which has adhesive properties and is capable of compression and decompression. For example, each of the first adhesive layer 206 and the second adhesive layer 207 can include epoxy resin, acrylic resin, silicone resin, or urethane resin, but embodiments of the present disclosure are not limited thereto.

According to an embodiment of the present disclosure, the vibration part 201 can be configured as one body by the first and second cover members 204 and 205, thereby providing the vibration apparatus 200 or the piezoelectric device 210, 220, and 230 having a simplified structure and a thin thickness.

Figure 14:
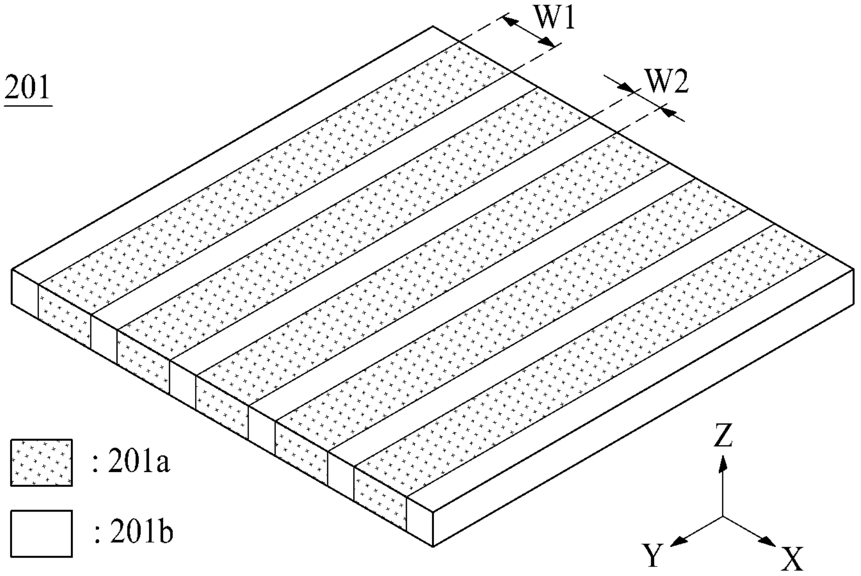
FIG. 14 illustrates a vibration part according to another embodiment of the present disclosure.

FIG. 14 illustrates a vibration part according to another embodiment of the present disclosure. FIG. 14 illustrates another embodiment of a vibration part illustrated in FIGS. 12 and 13.

Referring to FIGS. 12 and 14, a vibration part 201 according to another embodiment of the present disclosure can include a plurality of first portions 201*a* and a plurality of second portions 201*b*. For example, the plurality of first portions 201*a* and the plurality of second portions 201*b* can be alternately and repeatedly arranged along a first direction X (or a second direction Y). For example, the first direction X can be a widthwise direction of the vibration part 201, the second direction Y can be a lengthwise direction of the vibration part 201 intersecting with the first direction X, but embodiments of the present disclosure are not limited thereto. For example, the first direction X can be the lengthwise direction of the vibration part 201, and the second direction Y can be the widthwise direction of the vibration part 201.

Each of the plurality of first portions 201*a* can include an inorganic material having a piezoelectric effect (or a piezoelectric characteristic). For example, each of the plurality of first portions 201*a* can include at least one or more of a piezoelectric inorganic material and a piezoelectric organic material. For example, each of the plurality of first portions 201*a* can be an inorganic portion, an inorganic material portion, a piezoelectric portion, a piezoelectric material portion, or an electroactive portion, but embodiments of the present disclosure are not limited thereto.

According to an embodiment of the present disclosure, each of the plurality of first portions 201*a* can have a first width W1 parallel to the first direction X and can extend along a second direction Y intersecting the first direction X. Each of the plurality of first portions 201*a* can include a material which is be substantially the same as the vibration part 201 described above with reference to FIGS. 12 and 13, and thus, repeated descriptions thereof are omitted.

Each of the plurality of second portions 201*b* can be disposed between the plurality of first portions 201*a*. For example, each of the plurality of first portions 201*a* can be disposed between two adjacent second portions 201*b* of the plurality of second portions 201*b*. Each of the plurality of second portions 201*b* can have a second width W2 parallel to the first direction X (or the second direction Y) and can extend along the second direction Y (or the first direction X). The first width W1 can be the same as or different from the second width W2. For example, the first width W1 can be greater than the second width W2. For example, the first portion 201*a* and the second portion 201*b* can include a line shape or a stripe shape which has a same size or different sizes.

Each of the plurality of second portions 201*b* can be configured to fill a gap between two adjacent first portions of the plurality of first portions 201*a*. Each of the plurality of second portions 201*b* can be configured to fill a gap between two adjacent first portions of the plurality of first portions 201*a* and can be connected to or attached at a side surface of the first portion 201*a* adjacent thereto. According to an embodiment of the present disclosure, each of the plurality of first portions 201*a* and the plurality of second portions 201*b* can be disposed (or arranged) at the same plane (or the same layer) in parallel with each other. Therefore, the vibration part 201 can extend by a desired size or length based on the side coupling (or connection) of the first portion 201*a* and the second portion 201*b*.

According to an embodiment of the present disclosure, each of the plurality of second portions 201*b* can absorb an impact applied to the first portions 201*a*, and thus, can enhance the total durability of the first portions 201*a* and provide flexibility to the vibration part 201. Each of the plurality of second portions 201*b* can include an organic material having a flexible characteristic. For example, each of the plurality of second portions 201*a* can include one or more of an epoxy-based polymer, an acrylic-based polymer, and a silicone-based polymer, but embodiments of the present disclosure are not limited thereto. For example, each of the plurality of second portions 201*b* can be an organic portion, an organic material portion, an adhesive portion, an elastic portion, a bending portion, a damping portion, or a flexible portion, but embodiments of the present disclosure are not limited thereto.

A first surface of each of the plurality of first portions 201*a* and the plurality of second portions 201*b* can be connected to the first electrode part 202 in common. A second surface of each of the plurality of first portions 201*a* and the plurality of second portions 201*b* can be connected to the second electrode part 203 in common.

The plurality of first portions 201*a* and the plurality of second portions 201*b* can be disposed on (or connected to) the same plane, and thus, the vibration part 201 according to another embodiment of the present disclosure can have a single thin film-type. Accordingly, the piezoelectric device 210, 220, and 230 including the vibration part 201 according to another embodiment of the present disclosure can be vibrated in a vertical direction by the first portions 201*a* having a vibration characteristic and can be bent in a curved shape by the second portions 201*b* having flexibility.

Figure 15:
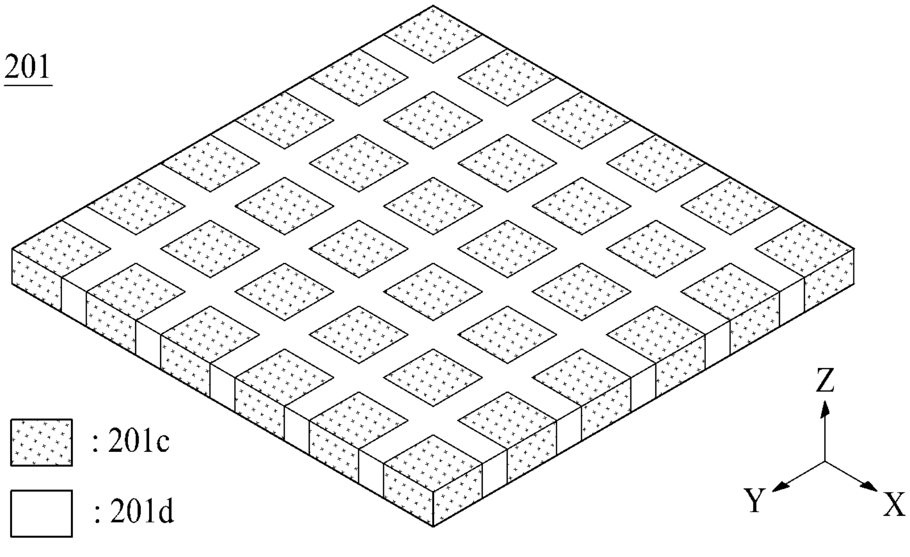
FIG. 15 illustrates a vibration part according to another embodiment of the present disclosure.

FIG. 15 illustrates a vibration part according to another embodiment of the present disclosure. FIG. 15 illustrates another embodiment of a vibration part illustrated in FIGS. 12 and 14.

Referring to FIGS. 12 and 15, a vibration part 201 according to another embodiment of the present disclosure can include a plurality of first portions 201*c*, and one or more second portion 201*d* disposed between the plurality of first portions 201*c*.

Each of the plurality of first portions 201*c* can be disposed to be spaced apart from one another along each of the first direction X and the second direction Y. For example, each of the plurality of first portions 201*c* can have a six-sided object shape having a same size and can be disposed in a lattice shape, but embodiments of the present disclosure are not limited thereto. For example, each of the plurality of first portions 201*c* can have a circular shape plate, an oval shape plate, or a polygonal shape plate, which have the same size as each other, but embodiments of the present disclosure are not limited thereto. Also, according to an embodiment, the plurality of first portions 201*a* and the plurality of second portions 201*b* can have a non-uniform spacing, such as being more densely packed together at a center area and more spread apart in an outer edge area or vice versa.

Each of the plurality of first portions 201*c* can include a piezoelectric material which is be substantially the same as the first portion 201*a* described above with reference to FIG. 14, and thus, repeated descriptions thereof are omitted.

The one or more second portion 201*d* can be disposed between the plurality of first portions 201*c* along each of the first direction X and the second direction Y. The one or more second portion 201*d* can be configured to fill a gap between two adjacent first portions 201*c* or to surround each of the plurality of first portions 201*c*, and thus, the one or more second portion 201*d* can be connected to or attached on the first portion 201*c* adjacent thereto. The one or more second portion 201*d* can include an organic material which is be substantially the same as the second portions 201*b* described above with reference to FIG. 14, and thus, repeated descriptions thereof are omitted.

A first surface of each of the plurality of first portions 201*c* and the one or more second portion 201*d* can be connected to the first electrode part 202 in common. A second surface of each of the plurality of first portions 201*c* and the one or more second portion 201*d* can be connected to the second electrode part 203 in common.

The plurality of first portions 201*c* and the second portion 201*d* can be disposed on (or connected to) the same plane, and thus, the vibration part 201 according to another embodiment of the present disclosure can have a single thin film-type. Accordingly, the piezoelectric device 210, 220, and 230 including the vibration part 201 according to another embodiment of the present disclosure can be vibrated in a vertical direction by the first portions 201*c* having a vibration characteristic and can be bent in a curved shape by the second portions 201*d* having flexibility.

Figure 16:
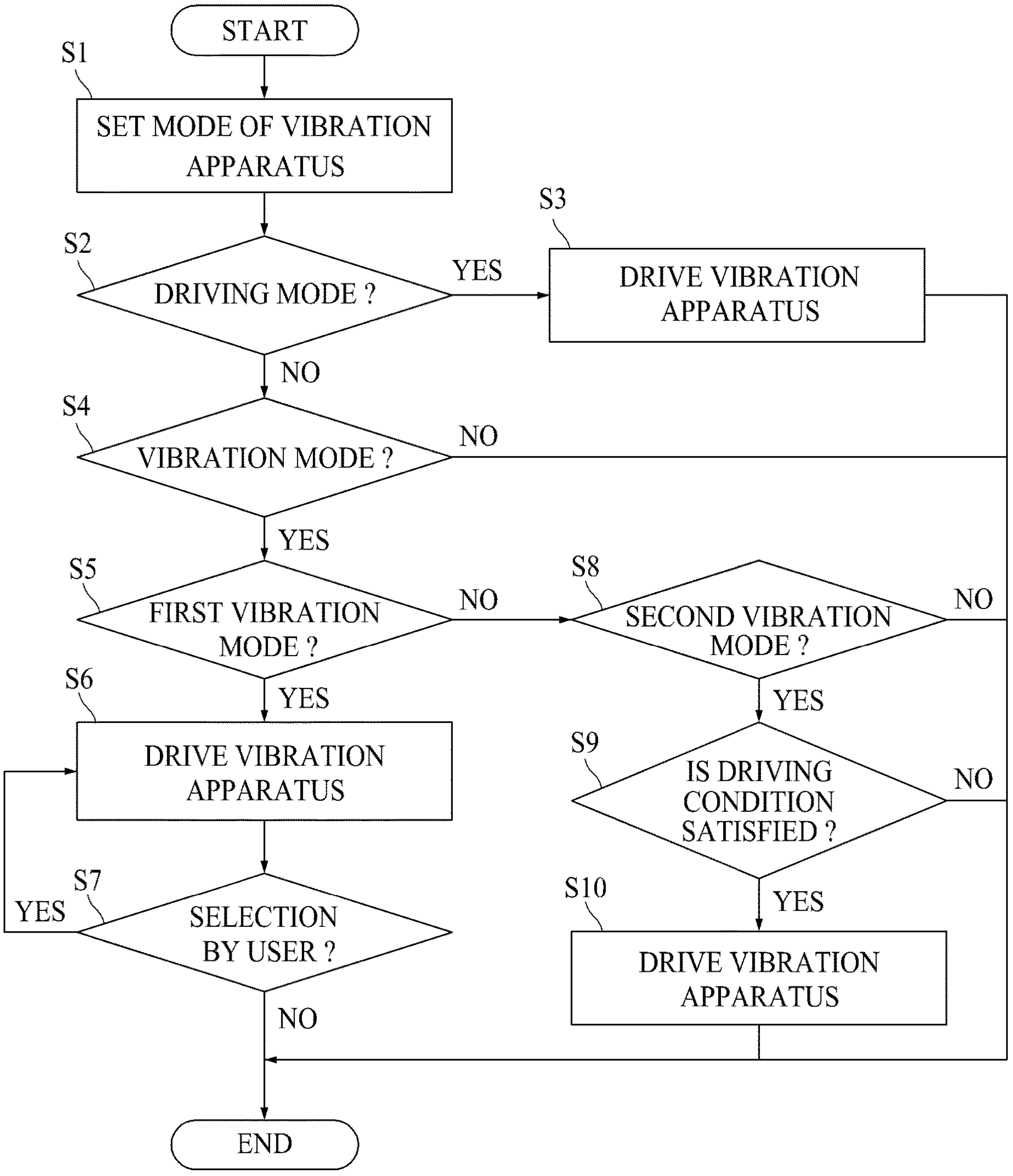
FIG. 16 is a flowchart illustrating a driving method of an apparatus according to an embodiment of the present disclosure.

FIG. 16 is a flowchart illustrating a driving method of an apparatus according to an embodiment of the present disclosure. FIG. 16 is a flowchart illustrating a driving method of the apparatuses 10, 20, 30, and 40 described above with reference to FIGS. 1 to 15.

A driving method of the apparatus according to an embodiment of the present disclosure described above with reference to FIGS. 1, 2, and 16 will be described below.

First, a mode of the vibration apparatus 200 (or a mode of the apparatus 10) can be set based on an input of a sound source signal, a user touch, a selection by the user, and a predetermined period (S1). In step S1, the apparatus 10 or the vibration apparatus 200 can be set to a driving mode, based on one or more of the input of the sound source signal and the user touch, or can be set to a vibration mode, based on the selection by the user or the predetermined period. The vibration mode of the apparatus 10 or the vibration apparatus 200 can be set to a first vibration mode, based on the selection by the user, or can be set to a second vibration mode, based on the predetermined period. The second vibration mode can be set based on a default setting time set in the apparatus 10 or a time (or a period) set by the user. For example, the second vibration mode can be set to a portion of a time for which the user does not use the apparatus 10. For example, the second vibration mode can be set to a portion of a time for which the apparatus 10 is being charged or a nighttime (or a sleeping time of the user) for which the apparatus 10 is not driven (or used), in the predetermined period. Also, according to an embodiment, the second vibration mode can be activated after a predetermined period of user inactivity (e.g., after 1 hour elapses from the last user input).

Subsequently, whether the mode of the vibration apparatus 200 (or the mode of the apparatus 10) is the driving mode can be determined (S2).

As a result of the determination performed in step S2, when the mode of the vibration apparatus is the driving mode ("Yes" of S2), the vibration apparatus 200 can be driven based on a driving signal according to the driving mode of the apparatus 10 or the vibration apparatus 200 (S3). Step S3 can include a step of generating the driving signal according to the driving mode, based on one or more of the input of the sound source signal and the user touch, and a step of driving the vibration apparatus 200 according to the driving signal. In step S3, the display member 100 can vibrate based on driving of the vibration apparatus 200 to output one or more of a sound and a haptic feedback (e.g., normal operation mode of providing sound and/or haptic feedback during active use by the user).

As a result of the determination performed in step S2, when the mode of the vibration apparatus is not the driving mode ("No" of S2), whether the mode of the vibration apparatus 200 is the vibration mode can be determined (S4). As a result of the determination performed in step S4, when the mode of the vibration apparatus 200 is not the driving mode ("No" of S4), the vibration apparatus 200 may not be driven and can end.

As a result of the determination performed in step S4, when the mode of the vibration apparatus 200 is the vibration mode ("Yes" of S4), the vibration apparatus 200 can be driven based on the driving signal according to the driving mode of the apparatus 10 or the vibration apparatus 200 to vibrate the display member 100. Accordingly, the display member 100 can vibrate based on a vibration of the vibration apparatus 200 based on the vibration signal, and thus, a dent which occurs in the display member 100 due to a press such as a finger touch or a pen touch or the like of the user can be restored (or recovered) based on a vibration of the display member 100.

According to an embodiment of the present disclosure, as a result of the determination performed in step S4, when the mode of the vibration apparatus 200 is the vibration mode ("Yes" of S4), the vibration apparatus 200 can be driven in a first vibration mode or a second vibration mode.

According to an embodiment of the present disclosure, as a result of the determination performed in step S4, when the mode of the vibration apparatus 200 is the vibration mode ("Yes" of S4), whether the vibration mode of the vibration apparatus 200 is the first vibration mode can be determined (S5).

As a result of the determination performed in step S5, when the vibration mode of the vibration apparatus 200 is the first vibration mode based on the selection by the user ("Yes" of S5), the vibration apparatus 200 can be driven according to the first vibration signal based on the first vibration mode of the vibration apparatus 200 (S6). Step S6 can include a step of generating the first vibration signal based on the first vibration mode and a step of driving the vibration apparatus 200 according to the first vibration signal to vibrate the display member 100. Accordingly, the display member 100 can vibrate based on a vibration of the vibration apparatus 200 based on the first vibration signal, and thus, a dent which occurs in the display member 100 due to the press such as the finger touch or the pen touch or the like of the user can be restored (or recovered) based on a vibration of the display member 100. According to an embodiment, the first vibration mode can be activated in response to a power off command or a power on command, or according to a predetermined schedule. Also, the first vibration mode can include a short and strong type of vibration, while the second vibration mode can include a long and weaker type of vibration, but embodiments are not limited thereto.

Subsequently, after step S6, a user selection on whether to repeat or additionally drive the vibration apparatus 200 in the first vibration mode can be determined (S7). In step S7, a pop-up image "Would you perform a first vibration mode (or a dent restoration mode) additionally?" can be displayed on the display panel 110, and when the user selects "Yes" ("Yes" of S7), the vibration apparatus 200 can be driven according to the first vibration signal based on the first vibration mode of the vibration apparatus 200 (S6). For example, when the user notices a dent in the display screen, be or she can active the first vibration mode on demand. In some situations, the first vibration mode can be repeatedly activated a number of times in a row. In step S7, when the user selects "No" ("No" of S7), the first vibration mode of the vibration apparatus 200 can end.

As a result of the determination performed in step S5, when the vibration mode of the vibration apparatus 200 is not the first vibration mode ("No" of S5), whether the vibration mode of the vibration apparatus 200 is the second vibration mode based on the predetermined period can be determined (S8).

As a result of the determination performed in step S8, when the vibration mode of the vibration apparatus 200 is not the second vibration mode ("No" of S8), the vibration mode of the vibration apparatus 200 can end.

As a result of the determination performed in step S8, when the vibration mode of the vibration apparatus 200 is the second vibration mode ("Yes" of S8), whether a driving condition of the second vibration mode of the vibration apparatus 200 is satisfied can be determined (S9). In step S9, when the apparatus 10 is one or more states of a state where the apparatus 10 is charged, a state where the apparatus 10 is not driven (or used) or a predetermined period of inactivity elapses, and a state where the apparatus 10 is not driven (or used) in a state where the apparatus 10 is not charged, it can be determined that the driving condition is satisfied, and in a state where the apparatus 10 is driven (or used), it can be determined that the driving condition is not satisfied.

As a result of the determination performed in step S9, when the driving condition of the second vibration mode of the vibration apparatus 200 is not satisfied ("No" of S9), the second vibration mode of the vibration apparatus 200 can end.

As a result of the determination performed in step S9, when the driving condition of the second vibration mode of the vibration apparatus 200 is satisfied ("Yes" of S9), the vibration apparatus 200 can be driven according to the second vibration signal based on the second vibration mode of the vibration apparatus 200 (S10). Step S10 can include a step of generating the second vibration signal based on the second vibration mode and a step of driving the vibration apparatus 200 according to the second vibration signal to vibrate the display member 100. Accordingly, the display member 100 can vibrate based on a vibration of the vibration apparatus 200 based on the second vibration signal, and thus, a dent which occurs in the display member 100 due to the press, such as the finger touch or the pen touch or the like of the user can be restored (or recovered) based on a vibration of the display member 100.

According to an embodiment of the present disclosure, the first vibration signal of the first vibration mode and the second vibration signal of the second vibration mode can have the same frequency, and the second vibration signal can have a voltage level which is lower than the first vibration signal. For example, the second vibration signal can be supplied to the vibration apparatus 200 for a time which is relatively longer than the first vibration signal. For example, the second vibration mode can be performed during a sleeping time of the user, and thus, can be performed for a longer amount of time than the first vibration mode in order to not disturb the user's sleep. Accordingly, the second vibration mode can be performed for a long time, based on a vibration which is weaker than the first vibration mode. For example, the first vibration mode can activate vibrations that last for a few seconds or minutes, while the second vibration mode can activate vibrations that last for a few hours, but embodiments are not limited thereto.

Figure 17A:
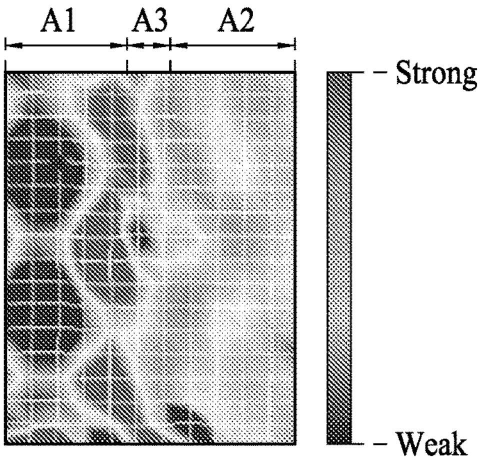
FIG. 17A illustrates a vibration displacement of the apparatus according to an embodiment of the present disclosure illustrated in FIGS. 1 to 3.
Figure 17B:
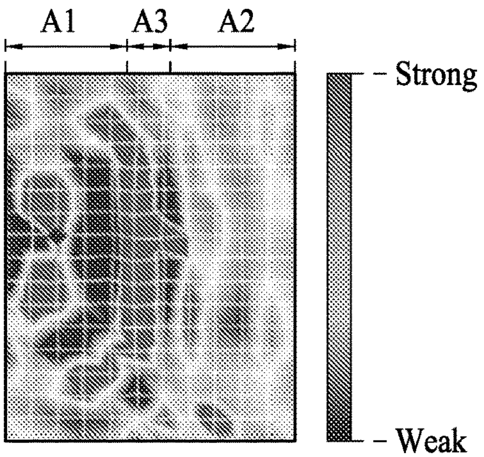
FIG. 17B illustrates a vibration displacement of the apparatus according to another embodiment of the present disclosure illustrated in FIGS. 6 and 7.
Figure 17C:
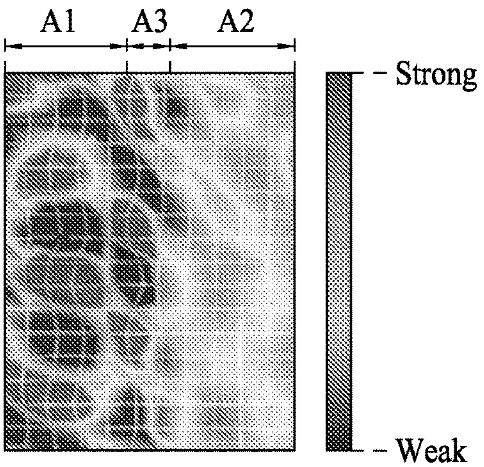
FIG. 17C illustrates a vibration displacement of the apparatus according to another embodiment of the present disclosure illustrated in FIGS. 8 and 9.

FIG. 17A illustrates a vibration displacement of the apparatus according to an embodiment of the present disclosure illustrated in FIGS. 1 to 3. FIG. 17B illustrates a vibration displacement of the apparatus according to another embodiment of the present disclosure illustrated in FIGS. 6 and 7. FIG. 17C illustrates a vibration displacement of the apparatus according to another embodiment of the present disclosure illustrated in FIGS. 8 and 9.

Referring to FIGS. 1 and 17A, in the apparatus 10 according to an embodiment of the present disclosure illustrated in FIGS. 1 to 3, it can be seen that the first display area A1 of the display member 100 is displaced based on a vibration of the vibration apparatus 200, and the second display area A2 of the display member 100 is displaced together. Accordingly, the vibration apparatus 200 disposed to overlap with the first display area A1 of the display member 100 can vibrate all of the first display area A1 and the second display area A2 of the display member 100. For example, the vibration apparatus 200 disposed to overlap with the first display area A1 of the display member 100 can vibrate an entire region of the display member 100, and thus, a dent which occurs at the first display area A1 and the second display area A2 of the display member 100 due to a press, such as a finger touch or a pen touch or the like of a user can be restored (or recovered).

Referring to FIGS. 1 and 17B, in the apparatus 20 according to another embodiment of the present disclosure illustrated in FIGS. 6 to 7, it can be seen that the first display area A1 of the display member 100 is displaced based on a vibration of the vibration apparatus 200, and the second display area A2 of the display member 100 is displaced together. Accordingly, the vibration apparatus 200 disposed to overlap with the first display area A1 of the display member 100 can vibrate all of the first display area A1 and the second display area A2 of the display member 100. For example, the vibration apparatus 200 disposed to overlap the first display area A1 of the display member 100 can vibrate an entire region of the display member 100, and thus, a dent which occurs at the first display area A1 and the second display area A2 of the display member 100 due to a press, such as a finger touch or a pen touch or the like of a user can be restored (or recovered).

Referring to FIGS. 1 and 17C, in the apparatus 30 according to another embodiment of the present disclosure illustrated in FIGS. 8 and 9, it can be seen that the first display area A1 of the display member 100 is displaced based on a vibration of the vibration apparatus 200, and the second display area A2 of the display member 100 is displaced together. A vibration displacement of the display member 100 illustrated in FIG. 17C can be greater than a vibration displacement of the display member 100 illustrated in FIG. 17B. Accordingly, the vibration apparatus 200 disposed to overlap with the first display area A1 of the display member 100 can vibrate all of the first display area A1 and the second display area A2 of the display member 100. For example, the vibration apparatus 200 disposed to overlap with the first display area A1 of the display member 100 can vibrate an entire region of the display member 100, and thus, a dent which occurs at the first display area A1 and the second display area A2 of the display member 100 due to a press, such as a finger touch or a pen touch or the like of a user can be restored (or recovered).

As seen in FIGS. 17A to 17C, even when the vibration apparatus 200 is disposed to overlap with one of the first display area A1 and the second display area A2 of the display member 100, the vibration apparatus 200 can vibrate the entire region of the display member 100. Accordingly, a dent occurring in each of the display areas A1 and A2 which do not overlap with the vibration apparatus 200 in the display areas A1 and A2 of the display member 100 can still be restored (or recovered) by a vibration of the display member 100 based on a vibration of the vibration apparatus 200.

Figure 18A:
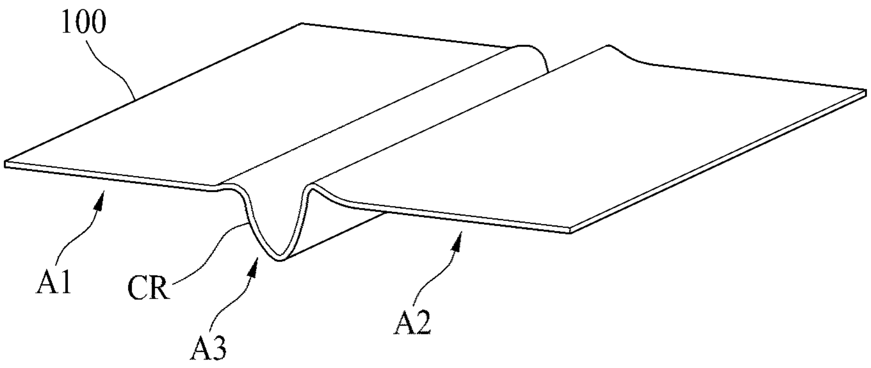
FIG. 18A illustrates creases occurring in a folding area in an apparatus according to an embodiment of the present disclosure.
Figure 18B:
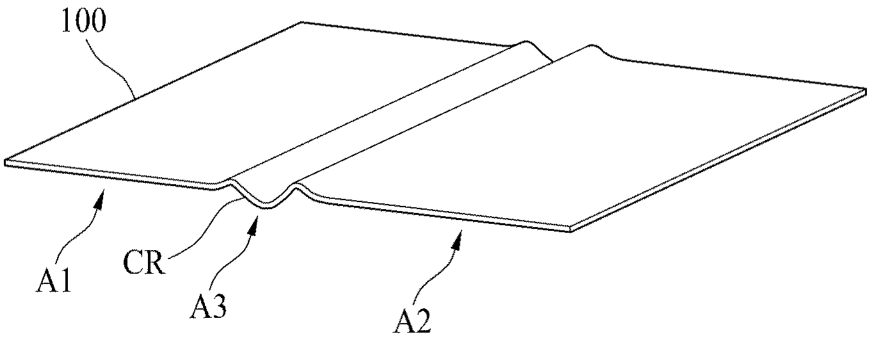
FIG. 18B illustrates a natural restoration state of creases occurring in the folding area in the apparatus illustrated in FIG. 18A according to an embodiment of the present disclosure.
Figure 18C:
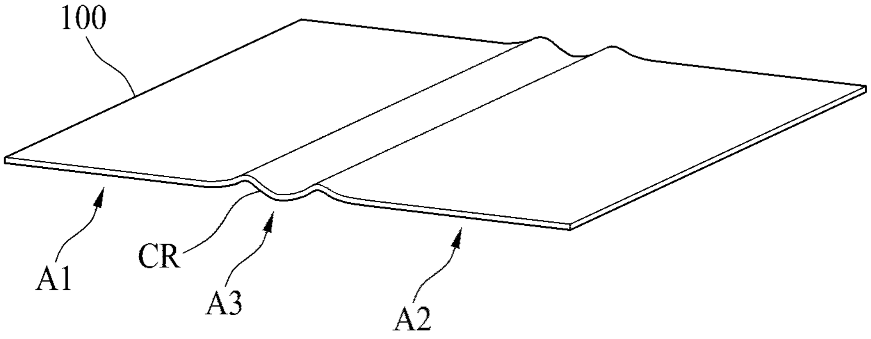
FIG. 18C illustrates a restoration state of creases occurring in the folding area in the apparatus illustrated in FIG. 18A, based on a vibration mode of a vibration apparatus according to an embodiment of the present disclosure.

FIG. 18A illustrates creases occurring in a folding area in an apparatus according to an embodiment of the present disclosure. FIG. 18B illustrates a natural restoration state of creases occurring in the folding area in the apparatus illustrated in FIG. 18A. FIG. 18C illustrates a restoration state of creases occurring in the folding area in the apparatus illustrated in FIG. 18A, based on a vibration mode of a vibration apparatus.

Referring to FIG. 18A, in the apparatus according to an embodiment of the present disclosure, creases CR occurs due to repeated bending or folding at a folding area A3 between a first display area A1 and a second display area A2. For example, an average height (or depth) of the creases CR occurring in the folding area A3 has been measured to be 154 μm.

Referring to FIG. 18B, in the apparatus illustrated in FIG. 18A, some of creases CR occurring at the folding area A3 can be naturally restored over time. For example, an average height (or depth) of the naturally restored creases CR has been measured to be 94 μm.

Referring to FIG. 18C, a display member of an apparatus according to an embodiment of the present disclosure can vibrate based on a vibration mode of a vibration apparatus. Therefore, creases CR occurring in a folding area A3 can be restored (or recovered) by a vibration of a display member 100 based on a vibration mode of the vibration apparatus. For example, an average height (or depth) of creases CR, restored by the vibration of the display member 100 based on the vibration mode of the vibration apparatus, has been measured to be 74 μm. For example, the amount of restoration of creases CR based on the vibration mode of the vibration apparatus can be enhanced by about 30% compared to the amount of natural restoration.

As seen in FIGS. 18A to 18C, the apparatus according to an embodiment of the present disclosure can improve the amount of restoration (or recovery) of creases CR occurring at the folding area A3, based on a vibration of the display member 100 based on a vibration of the vibration apparatus 200 disposed to overlap with one of the first display area A1 and the second display area A2 of the display member 100.

The following Table 1 shows a result of evaluation on the natural restoration of a dent in an apparatus according to an experimental example.

In evaluation, a pencil hardness evaluation method has been used, and five dents having a line shape have occurred at a first display area A1 of a display member with a force of 300 gf (gram force), for each of HB type pencil, F type pencil, H type pencil, 2H type pencil, 3H type pencil, and 4H type pencil, a dent at 0 hours has been evaluated with eyes, and a dent naturally restored after 24 hours elapse has been evaluated with eyes.

TABLE 1

| | First Display Area (A1) Evaluation time | | | |
|---|---|---|---|---|
| | 0 h | | 24 h | |
| | Evaluation level | | | |
| | Strong | Weak | Strong | Weak |
| HB type pencil | 1 | 4 | 1 | 2 |
| F type pencil | 1 | 4 | — | 1 |
| H type pencil | 3 | 2 | 1 | 1 |
| 2H type pencil | 2 | 3 | 1 | — |
| 3H type pencil | 1 | 4 | 1 | 2 |
| 4H type pencil | 0 | 5 | 2 | 2 |
| Total | 8 | 22 | 6 | 8 |

As seen in Table 1, immediately after evaluation (0 h), 8 dents of a strong level have occurred, and 22 dents of a weak level have occurred. After 24 hours, in natural restoration, 6 dents of a strong level still remain, and 8 dents of a weak level still remain. Accordingly, it can be seen that a dent of a weak level is more easily restore naturally over time, but a dent of a strong level is not easily restored naturally despite the long elapse of time.

The following Table 2 shows a result of evaluation on the restoration of a dent in the apparatus 10 according to an embodiment of the present disclosure illustrated in FIGS. 1 to 3.

In evaluation of Table 1, the pencil hardness evaluation method has been used, and five dents having a line shape have occurred in the first display area A1 of the display member with a force of 300 gf (gram force), for each of HB type pencil, F type pencil, H type pencil, 2H type pencil, 3H type pencil, and 4H type pencil, a dent at 0 hours has been evaluated with eyes, and a dent has been evaluated with eyes after the display member vibrates for 24 hours, based on a vibration mode of the vibration apparatus.

TABLE 2

| | First Display Area (A1) Evaluation time | | | |
|---|---|---|---|---|
| | 0 h | | 24 h | |
| | Evaluation level | | | |
| | Strong | Weak | Strong | Weak |
| HB type pencil | 0 | 5 | — | 1 |
| F type pencil | 1 | 4 | — | 1 |
| H type pencil | 3 | 2 | 1 | 1 |
| 2H type pencil | 2 | 2 | — | — |
| 3H type pencil | 2 | 3 | — | 1 |
| 4H type pencil | 1 | 4 | — | 3 |
| Total | 9 | 20 | 1 | 7 |

As seen in Table 2, immediately after evaluation (0 h), 9 dents of a strong level have occurred, and 20 dents of a weak level have occurred. In restoration based on the vibration mode executed for 24 hours, only 1 dent of a strong level still remains, and 7 dents of a weak level remain. Accordingly, it can be seen that the restoration of a dent of a strong level is greatly enhanced by the vibration mode of the vibration apparatus according to an embodiment of the present disclosure, compared to Table 1.

The following Table 3 shows a result of evaluation on the restoration of a dent in the apparatus 10 according to an embodiment of the present disclosure illustrated in FIGS. 1 to 3.

In evaluation of Table 3, the pencil hardness evaluation method has been used, and five dents having a line shape have occurred in the first and second display areas A1 and A2 of the display member with a force of 300 gf (gram force), for each of HB type pencil, F type pencil, H type pencil, 2H type pencil, 3H type pencil, and 4H type pencil, a dent at 0 hours has been evaluated with eyes, and a dent has been evaluated with eyes after the display member vibrates for 24 hours, based on the vibration mode of the vibration apparatus.

TABLE 3

| | First Display Area (A1) | | | | Second Display Area (A2) | | | |
|---|---|---|---|---|---|---|---|---|
| | Evaluation time | | | | | | | |
| | 0 h | | 24 h | | 0 h | | 24 h | |
| | Evaluation level | | | | | | | |
| | Strong | Weak | Strong | Weak | Strong | Weak | Strong | Weak |
| HB type pencil | 1 | 4 | 1 | 1 | 1 | 4 | 1 | — |

TABLE 3-continued

| | First Display Area (A1) | | | | Second Display Area (A2) | | | |
|---|---|---|---|---|---|---|---|---|
| | Evaluation time | | | | | | | |
| | 0 h | | 24 h | | 0 h | | 24 h | |
| | Evaluation level | | | | | | | |
| | Strong | Weak | Strong | Weak | Strong | Weak | Strong | Weak |
| F type pencil | 2 | 3 | — | 2 | 3 | 2 | 3 | — |
| H type pencil | 1 | 4 | 1 | — | 2 | 3 | 2 | 1 |
| 2H type pencil | 3 | 2 | — | 2 | 2 | 3 | 1 | 2 |
| 3H type pencil | 4 | 1 | 3 | 1 | 3 | 2 | 2 | 1 |
| 4H type pencil | 3 | 2 | 2 | 2 | 3 | 2 | 1 | 2 |
| Total | 15 | 15 | 7 | 8 | 14 | 16 | 10 | 6 |

As seen in Table 3, in evaluating the first display area A1 of the display member with eyes, immediately after evaluation (0 h), 15 dents of a strong level have occurred, and 15 dents of a weak level have occurred. In restoration based on the vibration mode executed for 24 hours, 7 dents of a strong level still remain, and 8 dents of a weak level remain. Also, in evaluating the second display area A2 of the display member with a viewer's eyes, immediately after evaluation (0 h), 14 dents of a strong level have occurred, and 16 dents of a weak level have occurred. In restoration based on the vibration mode executed for 24 hours, 10 dents of a strong level remains, and 6 dents of a weak level remain. Accordingly, it can be seen that the amount of restoration of a dent of a strong level occurring in the display member is improved based on a vibration of the display member based on the vibration mode of the vibration apparatus overlapping the first display area A1 of the display member. Also, it can be seen that a dent occurring in the first display area A1 of the display member and a dent occurring in the second display area A2 of the display member which does not overlap with the vibration apparatus are both restored based on the vibration of the display member based on the vibration mode of the vibration apparatus overlapping with the first display area A1 of the display member.

The following Table 4 shows a result of evaluation on the restoration of a dent in the apparatus 20 according to an embodiment of the present disclosure illustrated in FIGS. 6 and 7.

The evaluation of Table 4 is the same as the pencil hardness evaluation method for Table 3, and thus, repeated descriptions are omitted.

TABLE 4

| | First Display Area (A1) | | | | Second Display Area (A2) | | | |
|---|---|---|---|---|---|---|---|---|
| | Evaluation time | | | | | | | |
| | 0 h | | 24 h | | 0 h | | 24 h | |
| | Evaluation level | | | | | | | |
| | Strong | Weak | Strong | Weak | Strong | Weak | Strong | Weak |
| HB type pencil | 0 | 5 | — | — | 1 | 4 | — | — |
| F type pencil | 1 | 4 | — | — | 1 | 4 | 1 | — |
| H type pencil | 2 | 3 | — | 2 | 2 | 3 | 2 | 1 |
| 2H type pencil | 1 | 4 | — | 1 | 2 | 3 | 1 | 1 |
| 3H type pencil | 1 | 4 | — | 1 | 1 | 4 | — | 1 |
| 4H type pencil | 2 | 3 | 1 | 1 | 2 | 3 | — | 3 |
| Total | 7 | 23 | 1 | 5 | 9 | 21 | 4 | 6 |

As seen in Table 4, in evaluating the first display area A1 of the display member with a viewer's eyes, immediately after evaluation (0 h), 7 dents of a strong level have occurred, and 23 dents of a weak level have occurred. In restoration based on the vibration mode executed for 24 hours, 1 dents of a strong level still remain, and 5 dents of a weak level remain. Also, in evaluating the second display area A2 of the display member with a viewer's eyes, immediately after evaluation (0 h), 9 dents of a strong level have occurred, and 21 dents of a weak level have occurred. In restoration based on the vibration mode executed for 24 hours, 4 dents of a strong level still remain, and 6 dents of a weak level remain. Accordingly, it can be seen that the amount of restoration of a dent of a strong level occurring in the display member is improved based on a vibration of the display member based on the vibration mode of the vibration apparatus overlapping with the first display area A1 of the display member. Also, it can be seen that a dent occurring in the first display area A1 of the display member and a dent occurring in the second display area A2 of the display member which does not overlap with the vibration apparatus are restored based on the vibration of the display member based on the vibration mode of the vibration apparatus overlapping with the first display area A1 of the display member.

The following Table 5 shows a result of evaluation on the restoration of a dent in the apparatus 20 according to an embodiment of the present disclosure illustrated in FIGS. 8 and 9.

The evaluation of Table 5 is the same as the pencil hardness evaluation method for Table 3, and thus, repeated descriptions are omitted.

TABLE 5

| | First Display Area (A1) | | | | Second Display Area (A2) | | | |
|---|---|---|---|---|---|---|---|---|
| | Evaluation time | | | | | | | |
| | 0 h | | 24 h | | 0 h | | 24 h | |
| | Evaluation level | | | | | | | |
| | Strong | Weak | Strong | Weak | Strong | Weak | Strong | Weak |
| HB type pencil | 1 | 4 | — | — | 1 | 4 | 1 | — |
| F type pencil | 1 | 4 | — | 1 | 1 | 4 | — | 1 |
| H type pencil | 2 | 3 | 1 | 1 | 2 | 3 | — | 1 |
| 2H type pencil | 1 | 4 | 1 | 1 | 1 | 4 | — | 4 |
| 3H type pencil | 2 | 3 | — | 3 | 2 | 3 | — | 3 |
| 4H type pencil | 2 | 3 | 1 | 2 | 3 | 2 | 2 | 1 |
| Total | 9 | 21 | 3 | 8 | 10 | 20 | 3 | 10 |

As seen in Table 5, in evaluating the first display area A1 of the display member with eyes, immediately after evaluation (0 h), 9 dents of a strong level have occurred, and 21 dents of a weak level have occurred. In restoration based on the vibration mode executed for 24 hours, 3 dents of a strong level remain, and 8 dents of a weak level remain. Also, in evaluating the second display area A2 of the display member with a viewer's eyes, immediately after evaluation (0 h), 10 dents of a strong level have occurred, and 20 dents of a weak level have occurred. In restoration based on the vibration mode executed for 24 hours, 3 dents of a strong level remain, and 10 dents of a weak level remain. Accordingly, it can be seen that the amount of restoration of a dent of a strong level occurring in the display member is improved based on a vibration of the display member based on the vibration mode of the vibration apparatus overlapping with the first display area A1 of the display member. Also, it can be seen that a dent occurring in the first display area A1 of the display member and a dent occurring in the second display area A2 of the display member which does not overlap with the vibration apparatus are both restored based on the vibration of the display member based on the vibration mode of the vibration apparatus overlapping with the first display area A1 of the display member.

In Tables 1 to 5, immediately after evaluation (0 h), the number of dents of each of a strong level and a weak level can differ, based on a physical properties difference between display members used in an experiment.

Therefore, the apparatus according to an embodiment of the present disclosure can vibrate the display member in the vibration mode of the vibration apparatus, and thus, can restore (or recover) a dent, occurring in the display member 100 due to a press, such as a finger touch or a pen touch or the like of a user, for a short time.

An apparatus and a method of driving an apparatus according to an embodiment of the present disclosure will be described below.

An apparatus according to an embodiment of the present disclosure can include a display member configured to display an image, and a vibration apparatus at a rear surface of the display member. The vibration apparatus can vibrate the display member using a driving signal based on a driving mode and can vibrate the display member using a vibration signal based on a vibration mode.

According to one or more embodiments of the present disclosure, the vibration apparatus can vibrate the display member based on the driving signal to output one or more of a sound and a haptic feedback.

According to one or more embodiments of the present disclosure, the driving signal can include a sound signal, and the vibration signal can have a single frequency.

According to one or more embodiments of the present disclosure, the driving signal can include a sound signal, and the vibration signal can have a single frequency corresponding to a resonance frequency of the vibration apparatus.

According to one or more embodiments of the present disclosure, the vibration apparatus can include a piezoelectric device including a vibration part, the driving signal can include a sound signal, and the vibration signal can have a single frequency corresponding to a resonance frequency of the piezoelectric device.

According to one or more embodiments of the present disclosure, the vibration part can include at least one or more of a piezoelectric inorganic material and a piezoelectric organic material.

According to one or more embodiments of the present disclosure, the vibration part can include a plurality of first portions and one or more second portions between the plurality of first portions. Each of the plurality of first portions can include at least one or more of a piezoelectric inorganic material and a piezoelectric organic material. The one or more second portions can include an organic material.

According to one or more embodiments of the present disclosure, the display member can include a display panel including a pixel configured to display an image, a front member on the display panel, and a rear member. The vibration apparatus can be connected to the rear member. The display panel may be disposed between the front member and the rear member.

According to one or more embodiments of the present disclosure, the display member can include a first display area, a second display area, and a folding area between the first display area and the second display area. The vibration apparatus can be connected to the rear surface of the display member and overlap with one or more of the first display area and the second display area.

According to one or more embodiments of the present disclosure, the rear member can include a first supporting part overlapping with the first display area, a second supporting part overlapping with the second display area, and a third supporting part overlapping with the folding area. The third supporting part can include one or more holes or slits.

According to one or more embodiments of the present disclosure, the apparatus can further include a driving circuit part connected to the vibration apparatus. The driving circuit part can be configured to supply the driving signal based on the driving mode to the vibration apparatus and supply the vibration signal based on the vibration mode to the vibration apparatus.

According to one or more embodiments of the present disclosure, the vibration mode can include a first vibration mode and a second vibration mode. The driving circuit part can generate the first vibration signal based on the first vibration mode and supply the first vibration signal to the vibration apparatus and can generate the second vibration signal based on the second vibration mode and supply the second vibration signal to the vibration apparatus. The first vibration signal can be different than the second vibration signal.

According to one or more embodiments of the present disclosure, the first vibration signal and the second vibration signal can have the same frequency. A voltage level of the first vibration signal can be higher than a voltage level of the second vibration signal.

According to one or more embodiments of the present disclosure, a method of driving an apparatus can include driving a vibration apparatus in the apparatus according to a driving signal based on a driving mode of the apparatus to vibrate a display member, the vibration apparatus being disposed at a rear surface of the display member, and of driving the vibration apparatus according to a vibration signal based on a vibration mode of the apparatus to vibrate the display member.

According to one or more embodiments of the present disclosure, the driving signal can include a sound signal, and the vibration signal can have a single frequency.

According to one or more embodiments of the present disclosure, the single frequency of the vibration signal can correspond to a resonance frequency of the vibration apparatus.

According to one or more embodiments of the present disclosure, the driving the vibration apparatus based on the driving mode can include generating the driving signal according to the driving mode based on one or more of an input of a sound source signal and a user touch, and driving the vibration apparatus based on the driving signal. The display member can vibrate based on driving of the vibration apparatus to output one or more of a sound and a haptic feedback.

According to one or more embodiments of the present disclosure, the driving the vibration apparatus based on the driving mode can include generating the vibration signal based on the vibration mode in response to a selection by a user or based on a predetermined period, and driving the vibration apparatus according to the vibration signal to vibrate the display member.

According to one or more embodiments of the present disclosure, the generating the vibration signal can include generating a first vibration signal when the vibration mode is a first vibration mode based on the selection by the user, and generating a second vibration signal when the vibration mode is a second vibration mode based on the predetermined period. The second vibration signal can be different than the first vibration signal.

According to one or more embodiments of the present disclosure, the first vibration signal and the second vibration signal can have a same frequency. A voltage level of the first vibration signal can be higher than a voltage level of the second vibration signal.

A display apparatus according to one or more embodiments of the present disclosure can include display member configured to display an image a vibration apparatus disposed behind the display member and a controller. The controller can be configured to drive the vibration apparatus in a normal mode to output a sound or a haptic feedback and drive the vibration apparatus in a dent restoration mode to restore one or more dents or depressions in the display member.

According to one or more embodiments of the present disclosure, the controller can be further configured to activate the vibration apparatus to vibrate the display member for a first time period using a first vibration strength level while in the first vibration mode and activate the vibration apparatus to vibrate the display member for a second time period using a second vibration strength level while in the second vibration mode. The first time period can be different than the second time period or the first vibration strength level can be different than the second vibration strength level.

According to one or more embodiments of the present disclosure, the first vibration strength level can be greater than the second vibration strength level. The second time period can be longer than the first time period.

According to one or more embodiments of the present disclosure, the controller can be further configured to in response to receiving a user input, transition from the normal mode to the first vibration mode and activate the vibration apparatus to vibrate the display member for the first time period using the first vibration strength level and in response to a driving condition being satisfied or a predetermined scheduling time, transition from the normal mode to the second vibration mode and activate the vibration apparatus to vibrate the display member for the second time period using the second vibration strength level.

According to one or more embodiments of the present disclosure, the driving condition can be at a least one of a period of user inactivity elapsing, a charging mode being activated, or a power off signal for turning off the display apparatus.

According to one or more embodiments of the present disclosure, the first vibration mode and the second vibration mode both can include a vibration signal having a same frequency.

According to one or more embodiments of the present disclosure, the vibration apparatus can include a piezoelectric material.

A vibration apparatus according to one or more embodiments of the present disclosure can be applied to or included in a vibration apparatus disposed at an apparatus. The apparatus according to an embodiment of the present disclosure can be applied to mobile apparatuses, video phones, smart watches, watch phones, wearable apparatuses, foldable apparatuses, rollable apparatuses, bendable apparatuses, flexible apparatuses, curved apparatuses, sliding apparatuses, variable apparatuses, electronic organizers, electronic books, portable multimedia players (PMPs), personal digital assistants (PDAs), MP3 players, mobile medical devices, desktop personal computers (PCs), laptop PCs, netbook computers, workstations, navigation apparatuses, automotive navigation apparatuses, automotive display apparatuses, automotive apparatuses, theater apparatuses, theater display apparatuses, TVs, wall paper display apparatuses, signage apparatuses, game machines, notebook computers, monitors, cameras, camcorders, and home appliances, or the like. In addition, the vibration apparatus according to one or more embodiments of the present disclosure can be applied to or included in an organic light-emitting lighting apparatus or an inorganic light-emitting lighting apparatus. When the vibration apparatus is applied to or included in the lighting apparatuses, the lighting apparatuses can act as lighting and a speaker. In addition, when the vibration apparatus according to one or more embodiments of the present disclosure is applied to or included in the mobile apparatuses, or the like, the vibration apparatus can be one or more of a speaker, a receiver, and a haptic device, but embodiments of the present disclosure are not limited thereto.

It will be apparent to those skilled in the art that various modifications and variations can be made in the present disclosure without departing from the scope of the disclosure. Thus, it is intended that the present disclosure covers the modifications and variations of this disclosure provided that within the scope of the claims and their equivalents.

What is claimed is:

1. An apparatus, comprising:

a display member configured to display an image;

a vibration apparatus disposed at a rear surface of the display member; and a driving circuit part connected to the vibration apparatus, wherein the vibration apparatus is configured to:

vibrate the display member using a driving signal based on a driving mode, vibrate the display member using a vibration signal based on a vibration mode, wherein the driving signal includes a sound signal, wherein the vibration signal has a single frequency, wherein the driving circuit part is configured to:

supply the driving signal based on the driving mode to the vibration apparatus; and supply the vibration signal based on the vibration mode to the vibration apparatus, wherein the vibration mode includes a first vibration mode and a second vibration mode, wherein the driving circuit part is further configured to:

generate a first vibration signal based on the first vibration mode and supply the first vibration signal to the vibration apparatus; and generate a second vibration signal based on the second vibration mode and supply the second vibration signal to the vibration apparatus, wherein the first vibration signal is different than the second vibration signal, wherein the first vibration signal and the second vibration signal have a same frequency, and wherein a voltage level of the first vibration signal is higher than a voltage level of the second vibration signal.

2. The apparatus of claim 1, wherein the vibration apparatus vibrates the display member based on the driving signal to output one or more of a sound and a haptic feedback.

3. The apparatus of claim 1, wherein the vibration signal has the single frequency corresponding to a resonance frequency of the vibration apparatus.

4. The apparatus of claim 1, wherein the vibration apparatus includes a piezoelectric device including a vibration part, and wherein the vibration signal has the single frequency corresponding to a resonance frequency of the piezoelectric device.

5. The apparatus of claim 4, wherein the vibration part includes at least one or more of a piezoelectric inorganic material or a piezoelectric organic material.

6. The apparatus of claim 4, wherein the vibration part includes a plurality of first portions and one or more second portions disposed between the plurality of first portions, wherein each of the plurality of first portions includes at least one or more of a piezoelectric inorganic material or a piezoelectric organic material, and wherein the one or more second portions include an organic material.

7. The apparatus of claim 1, wherein the display member includes:

a display panel including a pixel configured to display an image;

a front member disposed on the display panel; and a rear member, and wherein the vibration apparatus is connected to the rear member, and the display panel is disposed between the front member and the rear member.

8. The apparatus of claim 7, wherein the display member includes a first display area, a second display area, and a folding area between the first display area and the second display area, and wherein the vibration apparatus is connected to the rear surface of the display member and overlaps with one or more of the first display area and the second display area.

9. The apparatus of claim 8, wherein the rear member includes:

a first supporting part overlapping with the first display area;

a second supporting part overlapping with the second display area; and a third supporting part overlapping with the folding area, and wherein the third supporting part includes one or more holes or slits.

10. A method of driving an apparatus, the method comprising:

driving a vibration apparatus in the apparatus according to a driving signal based on a driving mode of the apparatus to vibrate a display member, the vibration apparatus being disposed at a rear surface of the display member; and driving the vibration apparatus according to a vibration signal based on a vibration mode of the apparatus to vibrate the display member, wherein the driving signal includes a sound signal, wherein the vibration signal has a single frequency, wherein the driving the vibration apparatus based on the vibration mode includes:

generating the vibration signal based on the vibration mode in response to a selection by a user or based on a predetermined period; and driving the vibration apparatus according to the vibration signal to vibrate the display member, wherein the driving the vibration apparatus based on the vibration mode includes:

generating the vibration signal based on the vibration mode in response to a selection by a user or based on a predetermined period; and driving the vibration apparatus according to the vibration signal to vibrate the display member, wherein the generating the vibration signal includes:

generating a first vibration signal when the vibration mode is a first vibration mode based on the selection by the user; and generating a second vibration signal when the vibration mode is a second vibration mode based on the predetermined period, wherein the second vibration signal is different than the first vibration signal, wherein the first vibration signal and the second vibration signal have a same frequency, and wherein a voltage level of the first vibration signal is higher than a voltage level of the second vibration signal.

11. The method of claim 10, wherein the single frequency of the vibration signal corresponds to a resonance frequency of the vibration apparatus.

12. The method of claim 10, wherein the driving the vibration apparatus based on the driving mode includes:

generating the driving signal according to the driving mode based on one or more of an input of a sound source signal and a user touch; and driving the vibration apparatus based on the driving signal, and wherein the display member vibrates based on driving the vibration apparatus to output one or more of a sound and a haptic feedback.

13. A display apparatus, comprising:

a display member configured to display an image;

a vibration apparatus disposed behind the display member; and a controller configured to:

drive the vibration apparatus in a normal mode to output a sound or a haptic feedback, and drive the vibration apparatus in a dent restoration mode to restore one or more dents or depressions in the display member.

14. The display apparatus of claim 13, wherein the controller is further configured to:

activate the vibration apparatus to vibrate the display member for a first time period using a first vibration strength level while in a first vibration mode, and activate the vibration apparatus to vibrate the display member for a second time period using a second vibration strength level while in a second vibration mode, wherein the first time period is different than the second time period or the first vibration strength level is different than the second vibration strength level.

15. The display apparatus of claim 14, wherein the first vibration strength level is greater than the second vibration strength level, and wherein the second time period is longer than the first time period.

16. The display apparatus of claim 14, wherein the controller is further configured to:

in response to receiving a user input, transition from the normal mode to the first vibration mode and activate the vibration apparatus to vibrate the display member for the first time period using the first vibration strength level; and in response to a driving condition being satisfied or a predetermined scheduling time, transition from the normal mode to the second vibration mode and activate the vibration apparatus to vibrate the display member for the second time period using the second vibration strength level.

17. The display apparatus of claim 16, wherein the driving condition is at a least one of a period of user inactivity elapsing, a charging mode being activated, or a power off signal for turning off the display apparatus.

18. The display apparatus of claim 14, wherein the first vibration mode and the second vibration mode both include a vibration signal having a same frequency.

19. The display apparatus of claim 13, wherein the vibration apparatus includes a piezoelectric material.

* * * * *